United States Patent
Rajendran et al.

(10) Patent No.: US 12,426,095 B2
(45) Date of Patent: Sep. 23, 2025

(54) SYSTEM AND METHOD FOR ENHANCED PRACH CONFIGURATION AND IMPROVED PREAMBLE SUCCESS RATE

(71) Applicant: DISH Wireless L.L.C., Englewood, CO (US)

(72) Inventors: Karupaiah Rajendran, Englewood, CO (US); Norberto Amaya Gonzalez, Englewood, CO (US); Alyson Valdes Gonzalez, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 448 days.

(21) Appl. No.: 17/948,063

(22) Filed: Sep. 19, 2022

(65) Prior Publication Data
US 2024/0064822 A1    Feb. 22, 2024

Related U.S. Application Data

(60) Provisional application No. 63/399,179, filed on Aug. 18, 2022.

(51) Int. Cl.
  H04W 74/0833  (2024.01)
  H04W 74/08    (2024.01)

(52) U.S. Cl.
  CPC ... H04W 74/0841 (2013.01); H04W 74/0866 (2013.01)

(58) Field of Classification Search
  None
  See application file for complete search history.

(56) References Cited

U.S. PATENT DOCUMENTS

2011/0158104 A1  6/2011  Frenger et al.
2014/0211606 A1* 7/2014  Bergman .............. H04W 16/10
                                               370/217

(Continued)

FOREIGN PATENT DOCUMENTS

WO    2021/034247 A1    2/2021

OTHER PUBLICATIONS

"3rd Generation Partnership Project; Technical Specification Group Radio Access Network; NG-RAN; Architecture description (Release 16)," Technical Specification, 3GPP TS 38.401 V16.8.0, Dec. 2021, 79 pages.

(Continued)

*Primary Examiner* — Lonnie V Sweet
(74) *Attorney, Agent, or Firm* — Seed Intellectual Property Law Group LLP

(57) ABSTRACT

Systems and methods for enhanced PRACH 5G configuration by preventing interference with signal transmission. One such method includes: implementing a PRACH configuration in which the same root sequence index (RSI) is utilized across the sectors of the site, implementing the PRACH configuration in which a time shift is utilized for each preamble that provides each preamble with its own time slot, enabling multiple UEs to each send a preamble that is time shifted to arrive at the gNB at different times and avoid a RAPID (Random Access Preamble Identifier) mismatch, and receiving preambles that are frequency shifted and reducing PRACH interference among different sectors that causes a degradation of PRACH performance using shifts in time domain.

20 Claims, 21 Drawing Sheets

(56) References Cited

U.S. PATENT DOCUMENTS

| | | | |
|---|---|---|---|
| 2018/0132283 A1* | 5/2018 | Hui | H04W 72/0453 |
| 2019/0075023 A1* | 3/2019 | Sirotkin | H04W 88/08 |
| 2020/0245205 A1 | 7/2020 | Park et al. | |
| 2020/0396667 A1* | 12/2020 | Kaasalainen | H04W 76/10 |
| 2022/0022264 A1* | 1/2022 | Centonza | H04W 74/0833 |
| 2022/0150974 A1* | 5/2022 | Kim | H04W 74/0833 |
| 2022/0217781 A1* | 7/2022 | Decarreau | H04W 24/02 |
| 2022/0272770 A1* | 8/2022 | Centonza | H04W 74/0841 |
| 2023/0014537 A1* | 1/2023 | Berg | H04L 5/0051 |
| 2023/0126013 A1* | 4/2023 | Pinayour Chandrasekaran | H04W 74/002 370/329 |
| 2023/0171745 A1* | 6/2023 | Ghanbarinejad | H04W 76/19 370/329 |
| 2023/0171810 A1* | 6/2023 | Belleschi | H04W 74/0833 370/329 |
| 2023/0189380 A1* | 6/2023 | Palat | H04W 76/11 370/329 |
| 2023/0198815 A1* | 6/2023 | Lu | H04L 25/0258 375/262 |
| 2023/0239824 A1* | 7/2023 | Teshima | H04W 56/0055 370/350 |
| 2023/0397260 A1* | 12/2023 | Yilmaz | H04W 40/22 |
| 2024/0007531 A1* | 1/2024 | Kiilerich Pratas | H04W 4/70 |
| 2024/0015677 A1* | 1/2024 | Chau | H04L 7/0033 |
| 2024/0031812 A1* | 1/2024 | Vyas | H04W 12/122 |
| 2024/0039669 A1* | 2/2024 | Koskela | H04L 5/0051 |

OTHER PUBLICATIONS

Park et al., "An Efficient Time-Shifted Random Access Scheme for Cellular-Based IoT Networks," *IEEE Communications Letters* 23(3):522-525, Mar. 2019.

\* cited by examiner

Tabular Editor

Tables

- Sites and sectors
  - Sites
  - Antennas
    - Antennas
    - Antenna Electrical Parameters
    - Antenna Constraints
    - Optimization Constraints
  - Sectors
    - Sectors
    - Sector Antennas
    - Sector Antenna Ports
    - NR
      - Base Stations
      - Sectors
      - Sector Carriers
  - Neighbor Lists
    - NR - NR Neighbors
    - NR - NR BlackList
  - Secondary Cells
    - NR - NR Secondary Cells
  - Link Configurations

NR Sectors — 610 / 620 / 630

| | Cyclic Shift Configuration | Cyclic Shift Set | Cyclic Shift (Ncs) | Zadoff Chu Sequences Needed | Reserved Zadoff Chu Sequences |
|---|---|---|---|---|---|
| 1 | 12 | Unrestricted | 119 | 10 | 752-837 |
| 0 | 12 | Unrestricted | 119 | 10 | 752-837 |
| 2 | 12 | Unrestricted | 119 | 10 | 752-837 |
| 1 | 12 | Unrestricted | 119 | 10 | 752-837 |
| 0 | 12 | Unrestricted | 119 | 10 | 752-837 |
| 2 | 12 | Unrestricted | 119 | 10 | 752-837 |
| 1 | 12 | Unrestricted | 119 | 10 | 752-837 |
| 0 | 12 | Unrestricted | 119 | 10 | 752-837 |
| 2 | 12 | Unrestricted | 119 | 10 | 752-837 |
| 1 | 12 | Unrestricted | 119 | 10 | 752-837 |
| 0 | 12 | Unrestricted | 119 | 10 | 752-837 |
| 2 | 12 | Unrestricted | 119 | 10 | 752-837 |
| 1 | 12 | Unrestricted | 119 | 10 | 752-837 |
| 0 | 12 | Unrestricted | 119 | 10 | 752-837 |
| 2 | 12 | Unrestricted | 119 | 10 | 752-837 |
| 1 | 12 | Unrestricted | 119 | 10 | 752-837 |

Sites

Some items are in read-only mode because the Tabular Editor is open.
Site Templates ▶
Flags ▶
Groups ▼
▲ Local
▲ Shared
  ▷ Planned (532/1064/7980/0)
  ▷ Planned A (532/532/532/0)
Selections ▶
Sites (4868/5726/24727/0) ▶

☐ SiteFile,...,Spectrum_for_InfoVista_0408202 Map

Tabular Editor — 1510

Tables — NR Sectors

- Sites and sectors
  - Sites
  - Antennas
    - Antennas
    - Antenna Electrical Para
    - Antenna Constraints
    - Optimization Constraints
  - Sectors
    - Sectors
    - Sector Antennas
    - Sector Antenna Ports
  - NR
    - Base Stations
    - Sectors
    - Sector Carriers
  - Neighbor Lists
    - NR - NR Neighbors
    - NR - NR BlackList
  - Secondary Cells
    - NR - NR Secondary Cells
  - Link Configurations

| hift ation | Cyclic Shift Set | Cyclic Shift (Ncs) | Zadoff Chu Sequences Needed | Reserved Zadoff Chu Sequences | First Zadoff Chu Sequences | Number of Required Carriers |
|---|---|---|---|---|---|---|
| 12 | Unrestricted | 119 | 10 | 752-837 | Custom... | 1 |
| 12 | Unrestricted | 119 | 10 | 752-837 | ☑360 | 1 |
| 12 | Unrestricted | 119 | 10 | 752-837 | ☑370 | 1 |
| 12 | Unrestricted | 119 | 10 | 752-837 | ☑380 | 1 |
| 12 | Unrestricted | 119 | 10 | 752-837 | ☑390 | 1 |
| 12 | Unrestricted | 119 | 10 | 752-837 | ☑400 | 1 |
| 12 | Unrestricted | 119 | 10 | 752-837 | ☑410 | 1 |
| 12 | Unrestricted | 119 | 10 | 752-837 | ☑420 | 1 |
| 12 | Unrestricted | 119 | 10 | 752-837 | ☑430 | 1 |
| 12 | Unrestricted | 119 | 10 | 752-837 | ☑440 | 1 |
| 12 | Unrestricted | 119 | 10 | 752-837 | ☑450 | 1 |
| 12 | Unrestricted | 119 | 10 | 752-837 | ☑460 | 1 |
| 12 | Unrestricted | 119 | 10 | 752-837 | ☑470 | 1 |
| 12 | Unrestricted | 119 | 10 | 752-837 | ☑480 | 1 |
| 12 | Unrestricted | 119 | 10 | 752-837 | ☑490 | 1 |
| 12 | Unrestricted | 119 | 10 | 752-837 | ☑500 | 1 |
| 12 | Unrestricted | 119 | 10 | 752-837 | ☑510 | 1 |
| 12 | Unrestricted | 119 | 10 | 752-837 | ☑520 | 1 |
| 12 | Unrestricted | 119 | 10 | 752-837 | ☑530 | 1 |
| 12 | Unrestricted | 119 | 10 | 752-837 | ☑540 | 1 |
| 12 | Unrestricted | 119 | 10 | 752-837 | ☑550 | 1 |
| 12 | Unrestricted | 119 | 10 | 752-837 | ☑560 | 1 |
| 12 | Unrestricted | 119 | 10 | 752-837 | ☑570 | 1 |
| 12 | Unrestricted | 119 | 10 | 752-837 | ☑580 | 1 |
| 12 | Unrestricted | 119 | 10 | 752-837 | ☑590 | 1 |
| 12 | Unrestricted | 119 | 10 | 752-837 | ☑600 | 1 |
| 12 | Unrestricted | 119 | 10 | 752-837 | ☑610 | 1 |
| 12 | Unrestricted | 119 | 10 | 752-837 | ☑620 | 1 |
| 12 | Unrestricted | 119 | 10 | 752-837 | ☑630 | 1 |
| 12 | Unrestricted | 119 | 10 | 752-837 | ☑640 | 1 |
| 12 | Unrestricted | 119 | 10 | 752-837 | ☑650 | 1 |
| 12 | Unrestricted | 119 | 10 | 752-837 | ☑660 | 1 |
| 12 | Unrestricted | 119 | 10 | 752-837 | ☑670 | 1 |
| 12 | Unrestricted | 119 | 10 | 752-837 | ☑680 | 1 |
| 12 | Unrestricted | 119 | 10 | 752-837 | ☑690 | 1 |
| 12 | Unrestricted | 119 | 10 | 752-837 | ☑700 | 1 |
| 12 | Unrestricted | 119 | 10 | 752-837 | ☑710 | 1 |
| 12 | Unrestricted | 119 | 10 | 752-837 | ☑720 | 1 |
| 12 | Unrestricted | 119 | 10 | 752-837 | ☑730 | 1 |
| 12 | Unrestricted | 119 | 10 | 752-837 | ☑740 | 1 |
| 12 | Unrestricted | 119 | 10 | 752-837 | | 1 |

Tabular Editor

Tables

- Sites and sectors
  - Sites
  - Antennas
    - Antennas
    - Antenna Electrical Parameters
    - Antenna Constraints
    - Optimization Constraints
  - Sectors
    - Sectors
    - Sector Antennas
    - Sector Antenna Ports
- NR
  - Base Stations
  - Sectors — 1610
  - Sector Carriers
  - Neighbor Lists
    - NR - NR Neighbors
    - NR - NR BlackList
  - Secondary Cells
    - NR - NR Secondary Cells
  - Link Configurations

NR Sectors

| Site ID | Sector ID | Cyclic Shift Configuration | Cyclic Shift Set | Cyclic Shift (Ncs) | Zadoff Chu Sequences Needed | Reserved Zadoff Chu Sequences | First Zadoff Chu Sequences |
|---|---|---|---|---|---|---|---|
| DEDET00004A | n29_E_DL_1 | 12 | Unrestricted | 119 | 10 | 752-837 | 0 |
| DEDET00004A | n29_E_DL_2 | 12 | Unrestricted | 119 | 10 | 752-837 | 0 |
| DEDET00004A | n29_E_DL_3 | 12 | Unrestricted | 119 | 10 | 752-837 | 0 |
| DEDET00004A | n66_AWS-4_DL_1 | 12 | Unrestricted | 119 | 10 | 752-837 | 0 |
| DEDET00004A | n66_AWS-4_DL_2 | 12 | Unrestricted | 119 | 10 | 752-837 | 0 |
| DEDET00004A | n66_AWS-4_DL_3 | 12 | Unrestricted | 119 | 10 | 752-837 | 0 |
| DEDET00004A | n66_G_1 | 12 | Unrestricted | 119 | 10 | 752-837 | 0 |
| DEDET00004A | n66_G_2 | 12 | Unrestricted | 119 | 10 | 752-837 | 0 |
| DEDET00004A | n66_G_3 | 12 | Unrestricted | 119 | 10 | 752-837 | 0 |
| DEDET00004A | n70_AWS-4_UL... | 12 | Unrestricted | 119 | 10 | 752-837 | 0 |
| DEDET00004A | n70_AWS-4_UL... | 12 | Unrestricted | 119 | 10 | 752-837 | 0 |
| DEDET00004A | n70_AWS-4_UL... | 12 | Unrestricted | 119 | 10 | 752-837 | 0 |
| DEDET00004A | n71_F-G_1 | 12 | Unrestricted | 119 | 10 | 752-837 | 500 |
| DEDET00004A | n71_F-G_2 | 12 | Unrestricted | 119 | 10 | 752-837 | 0 |
| DEDET00004A | n71_F-G_3 | 12 | Unrestricted | 119 | 10 | 752-837 | 0 |
| DEDET00004A | n29_E_DL_1 | | | | | | 0 |

| Site ID | Sector ID | First Zadoff Chu Sequences |
|---|---|---|
| DEDET00004A | n29_E_DL_1 | 500 |
| DEDET00004A | n29_E_DL_2 | 500 |
| DEDET00004A | n29_E_DL_3 | 500 |
| DEDET00004A | n66_AWS-4_DL_1 | 500 |
| DEDET00004A | n66_AWS-4_DL_2 | 500 |
| DEDET00004A | n66_AWS-4_DL_3 | 500 |
| DEDET00004A | n66_G_1 | 500 |
| DEDET00004A | n66_G_2 | 500 |
| DEDET00004A | n66_G_3 | 500 |
| DEDET00004A | n70_AWS-4_UL... | 500 |
| DEDET00004A | n70_AWS-4_UL... | 500 |
| DEDET00004A | n70_AWS-4_UL... | 500 |
| DEDET00004A | n71_F-G_1 | 500 |
| DEDET00004A | n71_F-G_2 | 500 |
| DEDET00004A | n71_F-G_3 | 500 |

*FIG. 16B*

| Site Name | BAND | Site in gNodeb | SECTOR ID | Fiber Type | AOI | Market | prachCfgIndex |
|---|---|---|---|---|---|---|---|
| ATABY00003A | n29_E_DL | 1 | 1 | Lit | ABY | AT | 16 |
| ATABY00003A | n29_E_DL | 1 | 2 | Lit | ABY | AT | 17 |
| ATABY00003A | n29_E_DL | 1 | 3 | Lit | ABY | AT | 18 |
| ATABY00003A | n71_F | 1 | 1 | Lit | ABY | AT | 16 |
| ATABY00003A | n71_F | 1 | 2 | Lit | ABY | AT | 17 |
| ATABY00003A | n71_F | 1 | 3 | Lit | ABY | AT | 18 |
| ATABY00003A | n66_AWS-4_DL | 1 | 1 | Lit | ABY | AT | 16 |
| ATABY00003A | n66_AWS-4_DL | 1 | 2 | Lit | ABY | AT | 17 |
| ATABY00003A | n66_AWS-4_DL | 1 | 3 | Lit | ABY | AT | 18 |
| ATABY00003A | n70_AWS-4_UL15 | 1 | 1 | Lit | ABY | AT | 16 |
| ATABY00003A | n70_AWS-4_UL15 | 1 | 2 | Lit | ABY | AT | 17 |
| ATABY00003A | n70_AWS-4_UL15 | 1 | 3 | Lit | ABY | AT | 18 |
| ATABY00003A | n29_E_DL | 2 | 1 | Lit | ABY | AT | 16 |
| ATABY00003A | n29_E_DL | 2 | 2 | Lit | ABY | AT | 17 |
| ATABY00003A | n29_E_DL | 2 | 3 | Lit | ABY | AT | 18 |

SYSTEM AND METHOD FOR ENHANCED PRACH CONFIGURATION AND IMPROVED PREAMBLE SUCCESS RATE

BACKGROUND

As the use of smart phones and Internet of Things (IoT) devices has increased, so too has the desire for more reliable, fast, and continuous transmission of content. In an effort to improve the content transmission, networks continue to improve with faster speeds and increased bandwidth. The advent and implementation of Fifth Generation (5G) wireless technology has resulted in faster speeds and increased bandwidth. Thus, minimizing interruptions in the supporting networking infrastructure is important to providing a resilient and stable network with the desired end-to-end performance. It is with respect to these and other considerations that the embodiments described herein have been made.

BRIEF SUMMARY

The present disclosure relates generally to telecommunication networks, more particularly, to an enhanced PRACH 5G configuration system for improved preamble success rate that prevents interference with signal transmission.

Briefly stated, one or more methods for an enhanced PRACH 5G configuration system by preventing interference with signal transmission are disclosed. Some such methods include: providing, by a mobile network operator, a distributed unit (DU) of a fifth-generation New Radio (5G NR) cellular telecommunication network radio access network (RAN) that is served by a particular 5G NR cellular site base station, wherein the DU: is associated with a 5G NR Next Generation Node B (gNB) identified by a primary identifier (ID); and is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID; implementing a PRACH configuration in which the same root sequence index (RSI) is utilized across the sectors of the site; implementing the PRACH configuration in which a time shift is utilized for each preamble that provides each preamble with its own time slot; enabling multiple UEs to each send a preamble that is time shifted to arrive at the gNB at different times and avoid a RAPID (Random Access Preamble Identifier) mismatch; and receiving preambles that are time shifted and reducing PRACH interference among different sectors that causes a degradation of PRACH performance using shifts in time domain.

In some embodiments, the methods for an enhanced PRACH 5G configuration system reduce latency by improving preamble success rate. In another aspect of some embodiments, the method further includes assigning PRACH configuration index values of 16, 17, and 18 for sectors Alpha, Beta, and Gamma, respectively. In still another aspect of some embodiments, the method further includes moving the PRB (Physical Resource Block) location away from interference, in response to interference being identified as too high in certain PRB regions where PRACH is implemented.

In yet another aspect of some embodiments, the method further includes assigning three sectors per site. Also, in one or more aspects of some embodiments, the method further includes assigning a different PRACH configuration index per sector. Furthermore, in some embodiments, the method also includes tricking a PRACH planning tool for planning sequence so that same PRACH RSIs are allocated for different sectors, wherein the PRACH planning tool is configured to only view at a single sector, and then replicate the RSI to different sectors with different time shift values.

In other embodiments, one or more systems for enhanced PRACH (Physical Random Access Channel) 5G configuration are disclosed. The system includes a memory that stores computer-executable instructions; and a processor that executes the computer-executable instructions to: provide, by a mobile network operator, a distributed unit (DU) of a fifth-generation New Radio (5G NR) cellular telecommunication network radio access network (RAN) that is served by a particular 5G NR cellular site base station, wherein the DU: is associated with a 5G NR Next Generation Node B (gNB) identified by a primary identifier (ID); and is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID; implement a PRACH configuration in which the same root sequence index (RSI) is utilized across the sectors of the site; implement the PRACH configuration in which a frequency shift is utilized for each preamble that provides each preamble with its own frequency; enable multiple UEs to each send a preamble that is frequency shifted to arrive at the gNB at different frequencies and avoid a RAPID (Random Access Preamble Identifier) mismatch; and receive preambles that are frequency shifted and reduce PRACH interference among different sectors that causes a degradation of PRACH performance using shifts in frequency domain.

In some embodiments, the enhanced PRACH 5G configuration system reduces latency by improving preamble success rate. In another aspect of some embodiments, message Frequency Start values of 4, 10, and 16 are used for sectors Alpha, Beta, and Gamma, respectively. In still another aspect of some embodiments, there are three sectors per site. In yet another aspect of some embodiments, a different PRACH configuration index is used per sector. Also, in one or more aspects of some embodiments, a PRACH planning tool for planning sequences is tricked so that the same PRACH RSIs are allocated for different sectors, wherein the PRACH planning tool is configured to only view at a single sector, and then replicate the RSI to different sectors with different frequency shift values.

Additionally, in other embodiments, one or more non-transitory computer-readable storage mediums are disclosed. The one or more non-transitory computer-readable storage mediums have computer-executable instructions stored thereon that, when executed by a processor, cause the processor to: provide, by a mobile network operator, a distributed unit (DU) of a fifth-generation New Radio (5G NR) cellular telecommunication network radio access network (RAN) that is served by a particular 5G NR cellular site base station, wherein the DU: is associated with a 5G NR Next Generation Node B (gNB) identified by a primary identifier (ID); and is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID; implement a PRACH configuration in which the same root sequence index (RSI) is utilized across the sectors of the site; implement the PRACH configuration in which one or more of a time shift or frequency shift is utilized for each preamble that provides each preamble with its own time slot, frequency, or both; enable multiple UEs to each send a preamble that is time shifted, frequency shifted, or both to arrive at the gNB at one or more of different times or frequencies and avoid a RAPID (Random Access Preamble Identifier) mismatch; and receive preambles that are frequency shifted, frequency shifted, or both and reduce PRACH interference among different sectors that causes a degradation of PRACH performance using shifts in one or more of time domain or frequency domain.

In some embodiments of the non-transitory computer-readable storage medium for an enhanced PRACH 5G configuration system, PRACH configuration index values of 16, 17, and 18 are used for sectors Alpha, Beta, and Gamma, respectively. In another aspect of some embodiments, message Frequency Start values of 4, 10, and 16 are used for sectors Alpha, Beta, and Gamma, respectively. In still another aspect of some embodiments, there are three sectors per site. In yet another aspect of some embodiments, a different PRACH configuration index is used per sector. Also, in one or more aspects of some embodiments, a PRACH planning tool for planning sequences is tricked so that the same PRACH RSIs are allocated for different sectors, wherein the PRACH planning tool is configured to only view at a single sector, and then replicate the RSI to different sectors with different time shift values. Furthermore, in some embodiments, a PRACH planning tool for planning sequences is tricked so that the same PRACH RSIs are allocated for different sectors, wherein the PRACH planning tool is configured to only view at a single sector, and then replicate the RSI to different sectors with different frequency shift values.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 6 illustrates the Cyclic Shift Configuration in a PRACH planning tool for an enhanced PRACH 5G configuration system.

FIG. 8 illustrates creating a new group with only sector 1 for n71 bands in a PRACH planning tool for an enhanced PRACH 5G configuration system.

FIG. 15 illustrates the verification of final sequence=740 of a PRACH planning tool for an enhanced PRACH 5G configuration system.

FIGS. 16A and 16B illustrate the planned value applied to all the cells in the site of a PRACH planning tool for an enhanced PRACH 5G configuration system.

FIG. 17 illustrates the PRACH.CFG. Index in CIQ in a PRACH planning tool for an enhanced PRACH 5G configuration system.

DETAILED DESCRIPTION

Figure 1:
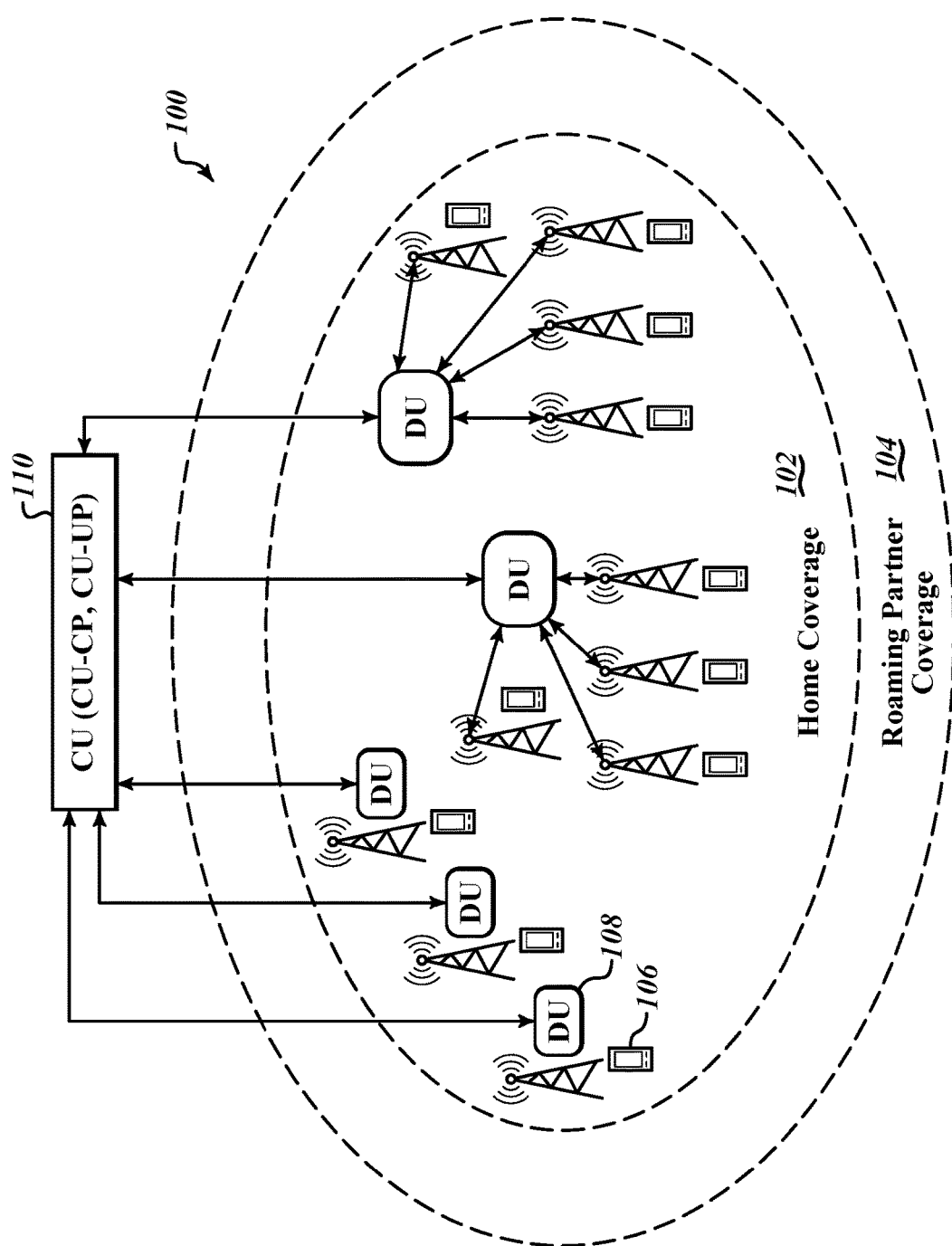
FIG. 1 illustrates a context diagram of an enhanced PRACH 5G configuration system by preventing interference with signal transmission, which may be implemented in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible, and virtual RAN with interfaces creating additional data access points.

5G network functions may be completely software-based and designed as cloud-native, meaning that they're agnostic to the underlying cloud infrastructure, allowing higher deployment agility and flexibility.

5G Core establishes reliable, secure connectivity to the network for end users and provides access to its services. 5G Core handles mobile network functions including connectivity, mobility management, authentication, subscriber data management, and policy management. 5G Core network functions are software-based and cloud-native, such that they may be used with various underlying cloud infrastructures.

With the advent of 5G, industry experts defined how the 5G Core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in Telecommunications that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which leverages IT development principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open-source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises a set of radio base stations (each known as Next Generation Node B (gNB)) connected to the 5G Core (5GC) and to each other. The gNB incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021 December). Each network function (NF) is formed by a combination of small pieces of software code called microservices.

A virtual private cloud (VPC) is a configurable pool of shared resources allocated within a public cloud environment. The VPC provides isolation between one VPC user and all other users of the same cloud, for example, by allocation of a private IP subnet and a virtual communication construct (e.g., a VLAN or a set of encrypted communication channels) per user. In some embodiments, this 5G network leverages the distributed nature of 5G cloud-native network functions and cloud flexibility, which optimizes the placement of 5G network functions for optimal performance based on latency, throughput and processing requirements.

In some embodiments, the network architecture utilizes a logical hierarchical architecture consisting of National Data Centers (NDCs), Regional Data Centers (RDCs) and Breakout Edge Data Centers (BEDCs), to accommodate the distributed nature of 5G functions and the varying requirements for service layer integration. In one or more embodiments, BEDCs are deployed in Local Zones hosting 5G NFs that have strict latency budgets. They may also be connected with Passthrough Edge Data Centers (PEDC), which serve as an aggregation point for all Local Data Centers (LDCs) and cell sites in a particular market. BEDCs also provide internet peering for 5G data service.

In one or more embodiments, an O-RAN network may be implemented that includes an RU (Radio Unit), which is deployed on towers and a DU (Distributed Unit), which controls the RU. These units interface with the Centralized Unit (CU), which is hosted in the BEDC at the Local Zone. These combined pieces provide a full RAN solution that handles all radio level control and subscriber data traffic.

In some embodiments, the User Plane Function (Data Network Name (DNN)) is collocated in the BEDC, which anchors user data sessions and routes to the internet. In another aspect, the BEDCs leverage local internet access available in Local Zones, which allows for a better user experience while optimizing network traffic utilization.

In one or more embodiments, the Regional Data Centers (RDCs) are hosted in the Region across multiple availability zones. The RDCs host 5G subscribers' signaling processes such as authentication and session management as well as voice for 5G subscribers. These workloads can operate with relatively high latencies, which allows for a centralized deployment throughout a region, resulting in cost efficiency and resiliency. For high availability, multiple RDCs are deployed in a region, each in a separate Availability Zone (AZ) to ensure application resiliency and high availability.

In another aspect of some embodiments, an AZ is one or more discrete data centers with redundant power, networking, and connectivity in a Region. In some embodiments, AZs in a Region are interconnected with high-bandwidth and low-latency networking over a fully redundant, dedicated metro fiber, which provides high-throughput, low-latency networking between AZs.

Cloud Native Functions (CNFs) deployed in the RDC utilize a high speed backbone to failover between AZs for application resiliency. CNFs like AMF and SMF, which are deployed in RDC, continue to be accessible from the BEDC in the Local Zone in case of an AZ failure. They serve as the backup CNF in the neighboring AZ and would take over and service the requests from the BEDC.

In this embodiment of the enhanced PRACH 5G configuration system by preventing interference with signal transmission, dedicated VPCs are implemented for each Data Center type (e.g., local data center, breakout edge data center, regional data center, national data center, and the like). In some such embodiments, the national data center VPC stretches across multiple Availability Zones (AZs). In another aspect of some embodiments, two or more AZs are implemented per region of the cloud computing service provider.

Some embodiments of the 5G Core network functions require support for advanced routing capabilities inside VPC and across VPCs (e.g., UPF, SMF and ePDG). These functions rely on routing protocols such as BGP for route exchange and fast failover (both stateful and stateless). To support these requirements, virtual routers are deployed on EC2 to provide connectivity within and across VPCs, as well as back to the on-prem network.

FIG. 1 illustrates a context diagram of an environment for an enhanced PRACH 5G configuration system for improved preamble success rate by preventing interference with signal transmission may be implemented in accordance with embodiments described herein.

A PRACH is the Physical Random Access Channel and it is used by end user mobile devices to request an uplink allocation from the base station. The PRACH Configuration Index specifies the index, which informs end user mobile devices which frame number and which subframe number within the frame has PRACH resources. Previously, PRACH planning tools have assumed that the PRACH configuration index is the same across the site. However, if the PRACH configuration index is the same across the network, it is hard to distinguish the preambles from each other in different sectors. Another way is needed to differentiate the preambles. If the preambles cannot be distinguished it can cause collision of the signals. Thus, the PRACH Root Sequence Index (RSI) traditionally had to change for different sectors. Notably, this method has significant drawbacks, including preamble collision and interference.

A given area 100 will mostly be covered by two or more mobile network operators' wireless networks. Generally, mobile network operators have some roaming agreements that allow users to roam from home network to partner network under certain conditions, shown in FIG. 1 as home coverage area 102 and roaming partner coverage area 104. Operators may configure the mobile user's device, referred to herein as user equipment (UE), such as UE 106, with priority and a timer to stay on the home network coverage area 102 versus the roaming partner network coverage area 104. If a UE (e.g., UE 106) cannot find the home network coverage area 102, the UE scans for a roaming network after a timer expiration (6 minutes, for example). This scanning delay could have significant impact on customer experience in case of a catastrophic failure in the network. As shown in FIG. 1, a 5G RAN is split into distributed units (DUs) (e.g., DU 108) that manage scheduling of all the users and a central unit (e.g., CU 110) that manages the mobility and radio resource control (RRC) state for all the UEs. The RRC is a layer within the 5G NR protocol stack. It exists in the control plane, in the UE and in the gNB. The behavior and functions of RRC are governed by the current state of RRC. In 5G NR, RRC has three distinct states: RRC_IDLE, RRC_CONNECTED and RRC_INACTIVE.

Figure 2:
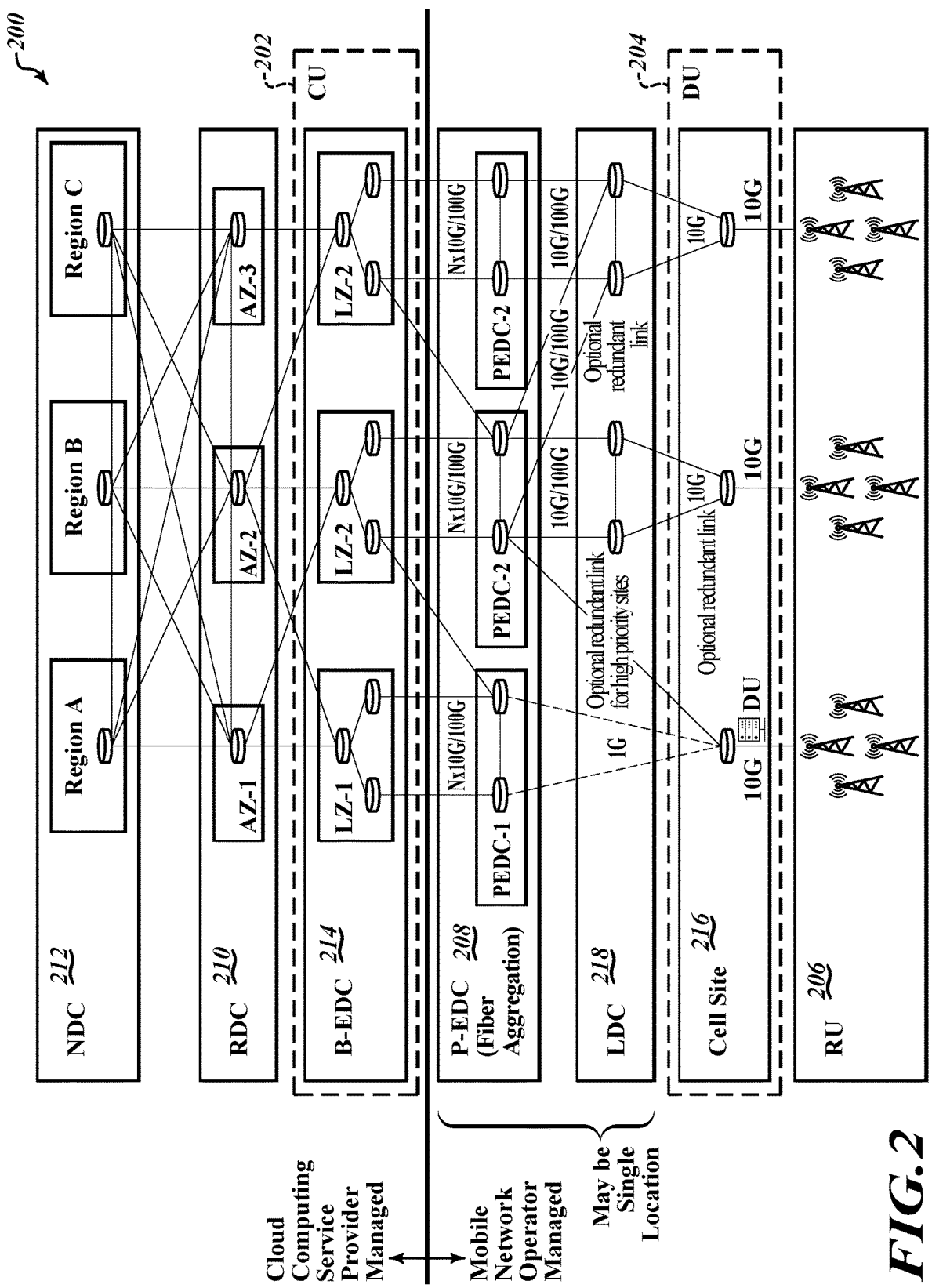
FIG. 2 illustrates a diagram of an example system architecture overview of a system in which the environment of FIG. 1, which may be implemented in accordance with embodiments described herein.

FIG. 2 illustrates a diagram of an example system architecture overview of a system 200 in which the environment of FIG. 1 may be implemented in accordance with embodiments described herein. In the system 200, beamforming is a traffic-signaling system used with 5G base stations that identifies the most efficient data-delivery route to a specific user. Beamforming also reduces interference for nearby users. In various embodiments, beamforming may implemented in several ways in 5G networks As shown in FIG. 2, the radio unit (RU) 206 converts radio signals sent to and from the antenna of a cell site 216 into a digital signal for transmission over packet networks. It handles the digital front end (DFE) and the lower physical (PHY) layer, as well as the digital beamforming functionality.

The DU 204 may sit close to the RU 206 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNB functions, depending on the functional split option, and its operation is controlled by the CU 202.

The CU 202 is the centralized unit that runs the RRC and Packet Data Convergence Protocol (PDCP) layers. A gNB (not individually illustrated) may comprise a CU and one DU connected to the CU via Fs-C and Fs-U interfaces for control plane (CP) and user plane (UP), respectively. A CU with multiple DUs can support multiple gNBs. The split architecture enables a 5G network to utilize different distribution of protocol stacks between CU 202 and DU 204 depending on mid-haul availability and network design. The CU 202 is a logical node that includes the gNB functions like transfer of user data, mobility control, RAN sharing, positioning, session management, etc., with the exception of functions that may be allocated exclusively to the DU 204. The CU 202 controls the operation of several DUs 204 over the mid-haul interface.

As mentioned above, 5G network functionality is split into two functional units: the DU 204, responsible for real time 5G layer 1 (L1) and 5G layer 2 (L2) scheduling functions, and the CU 202 responsible for non-real time, higher L2 and 5G layer 3 (L3). As shown in FIG. 2, the DU's server and relevant software may be hosted on a cell site 216 itself or can be hosted in an edge cloud (local data center (LDC) 218 or central office) depending on transport availability and fronthaul interface. The CU's server and relevant software may be hosted in a regional cloud data center or, as shown in FIG. 2, in a breakout edge data center (B-EDC) 214. As shown in FIG. 2, the DU 204 may be provisioned to communicate via a pass-through edge data center (P-EDC) 208. The P-EDC 208 may provide a direct circuit fiber connection from the DU directly to the primary cloud availability zone (e.g., B-EDC 214) hosting the CU 202. In some embodiments, the LDC 218 and P-EDC 208 may be co-located or in a single location. The CU 202 may be connected to a regional cloud data center (RDC) 210, which in turn may be connected to a national cloud data center (NDC) 212. In the example embodiment, the P-EDC 208, the LDC 218, the cell site 216 and the RU 206 may all be managed by the mobile network operator and the B-EDC 214, the RDC 210 and the NDC 212 may all be managed by a cloud computing service provider. According to various embodiments, the actual split between DU and RU may be different depending on the specific use-case and implementation.

Figure 3:
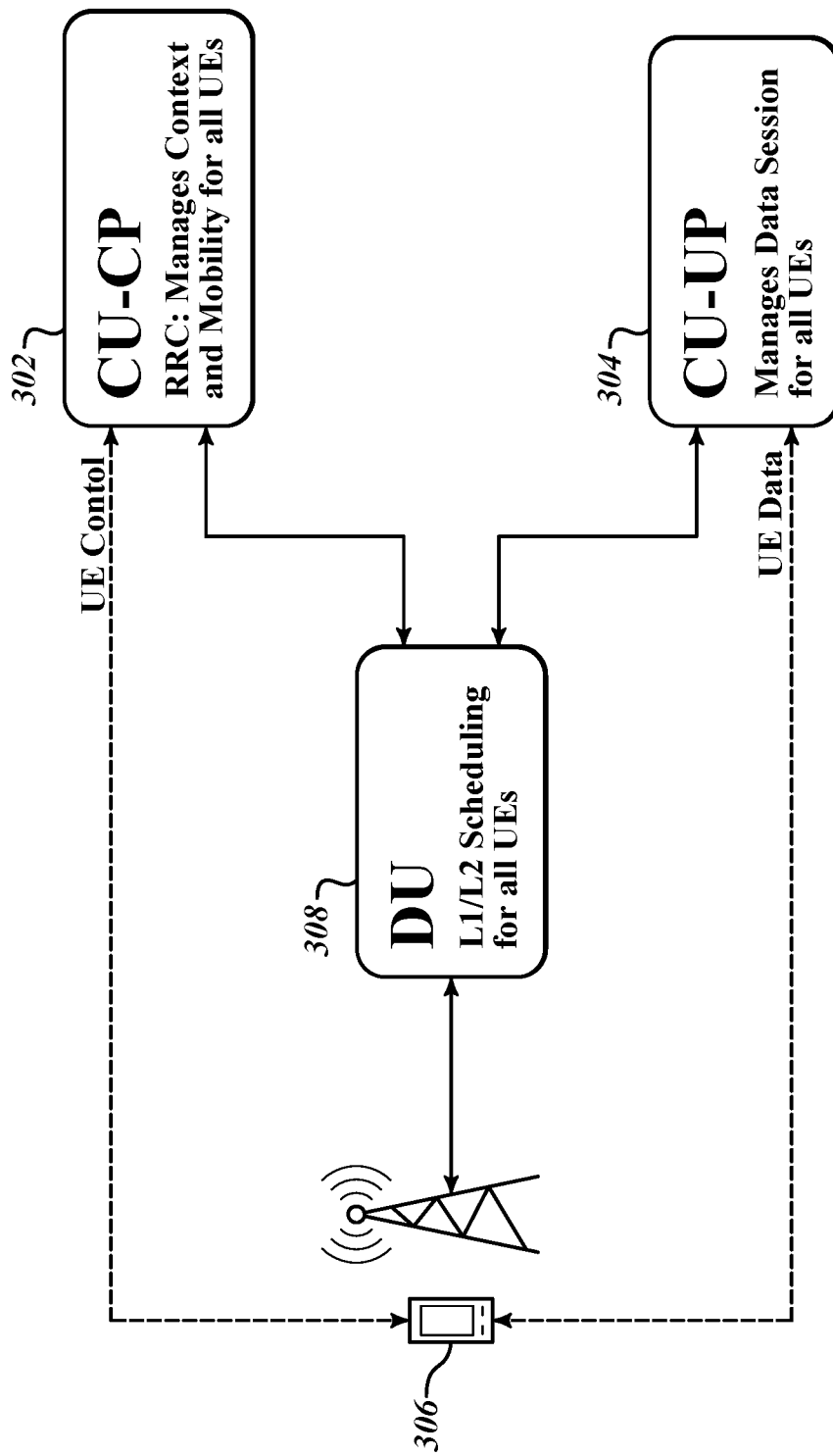
FIG. 3 illustrates a diagram showing connectivity between certain telecommunication network components during cellular telecommunication.

FIG. 3 is a diagram showing connectivity between certain telecommunication network components during cellular telecommunication in accordance with embodiments described herein.

The central unit control plane (CU-CP) 302, for example of CU 110 of FIG. 1 or CU 202 of FIG. 2, primarily manages control processing of DUs, such as DU 308, and UEs, such as UE 306. The CU-CP 302 hosts RRC and the control-plane part of the PDCP protocol. CU-CP 302 manages the mobility and radio resource control (RRC) state for all the UEs. The RRC is a layer within the 5G NR protocol stack and manages context and mobility for all UEs. The behavior and functions of RRC are governed by the current state of RRC. The DU 308 maintains a constant heartbeat with CU 302. The CU-UP 304 manages the data sessions for all UEs 306 and hosts the user plane part of the PDCP protocol.

Figure 4:
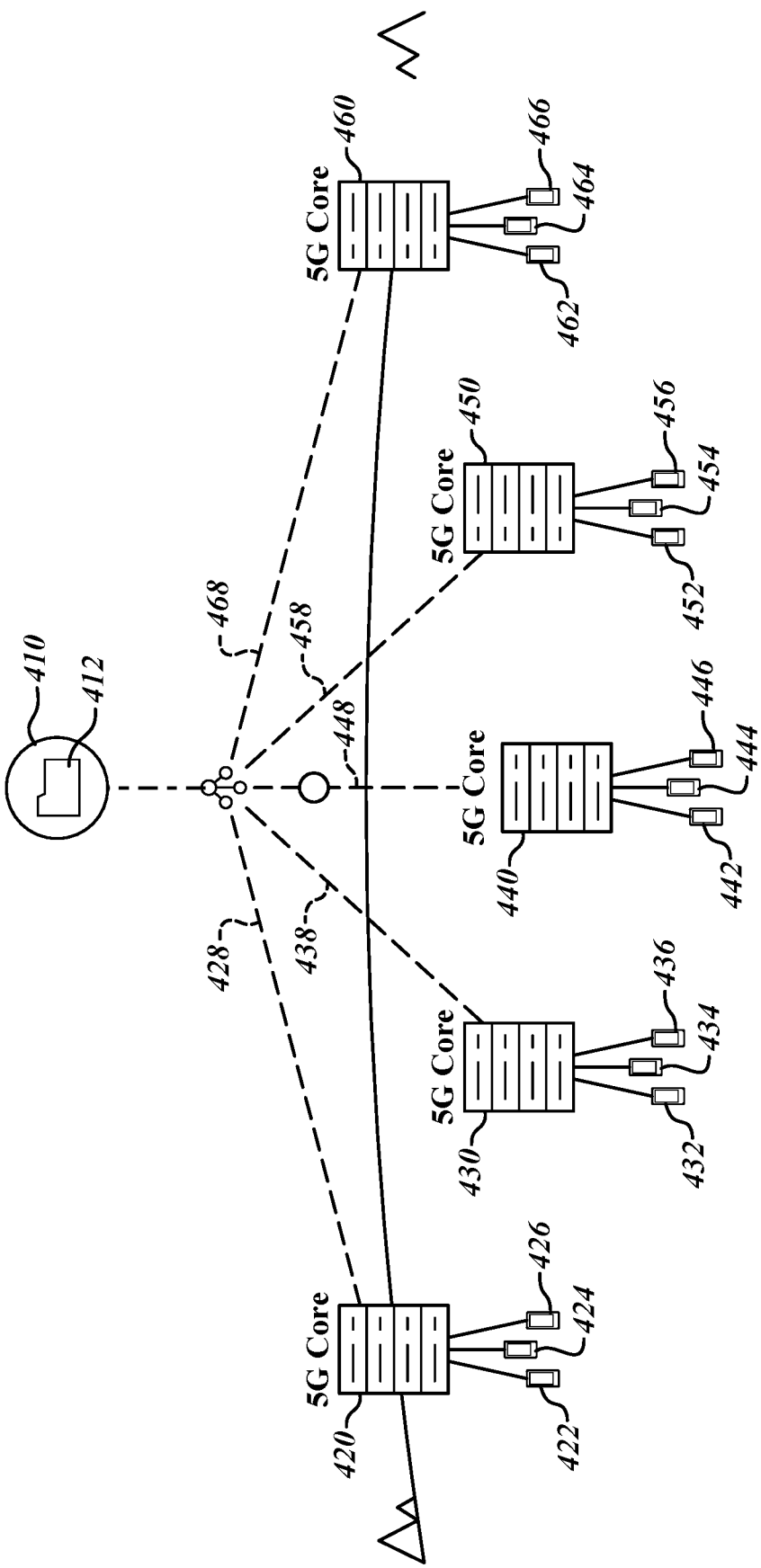
FIG. 4 illustrates a system that includes a central distributed subscriber database, a plurality of connected 5G Cores, and a plurality of mobile end user devices connected to each 5G Core.

FIG. 4 illustrates an enhanced PRACH 5G configuration system by preventing interference with signal transmission that includes a Unified Data Management System 410, central distributed subscriber database 412, a plurality of connected 5G Cores 420, 430, 440, 450, and 460, and a plurality of mobile end user devices 422, 424, 426, 432, 434, 436, 442, 444, 446, 452, 454, 456, 462, 464, and 466. In various embodiments, the plurality of mobile end user devices 422, 424, 426, 432, 434, 436, 442, 444, 446, 452, 454, 456, 462, 464, and 466 may be embodiments of UE 306 in FIG. 3.

The central distributed subscriber database 412 is contained in the Unified Data Management System 410. The plurality of connected 5G Cores 420, 430, 440, 450, and 460 are each connected to the central distributed subscriber database 412 by connection lines 428, 438, 448, 458, and 468. The connection lines 428, 438, 448, 458, and 468 transmit voice and data information as well as control information, between the central distributed subscriber database 412 and the plurality of connected 5G Cores 420, 430, 440, 450, and 460. Additionally, the plurality of mobile end user devices 422, 424, 426, 432, 434, 436, 442, 444, 446, 452, 454, 456, 462, 464, and 466 are each connected to their respective 5G Cores 420, 430, 440, 450, and 460. In some embodiments this is a direct connection, while in other embodiments, there are additional telephony components (e.g., base stations, antennas, receivers, and the like) that bridge the connection between the plurality of mobile end user devices 422, 424, 426, 432, 434, 436, 442, 444, 446, 452, 454, 456, 462, 464, and 466 that are each connected to their respective 5G Cores 420, 430, 440, 450, and 460.

Figure 5A:
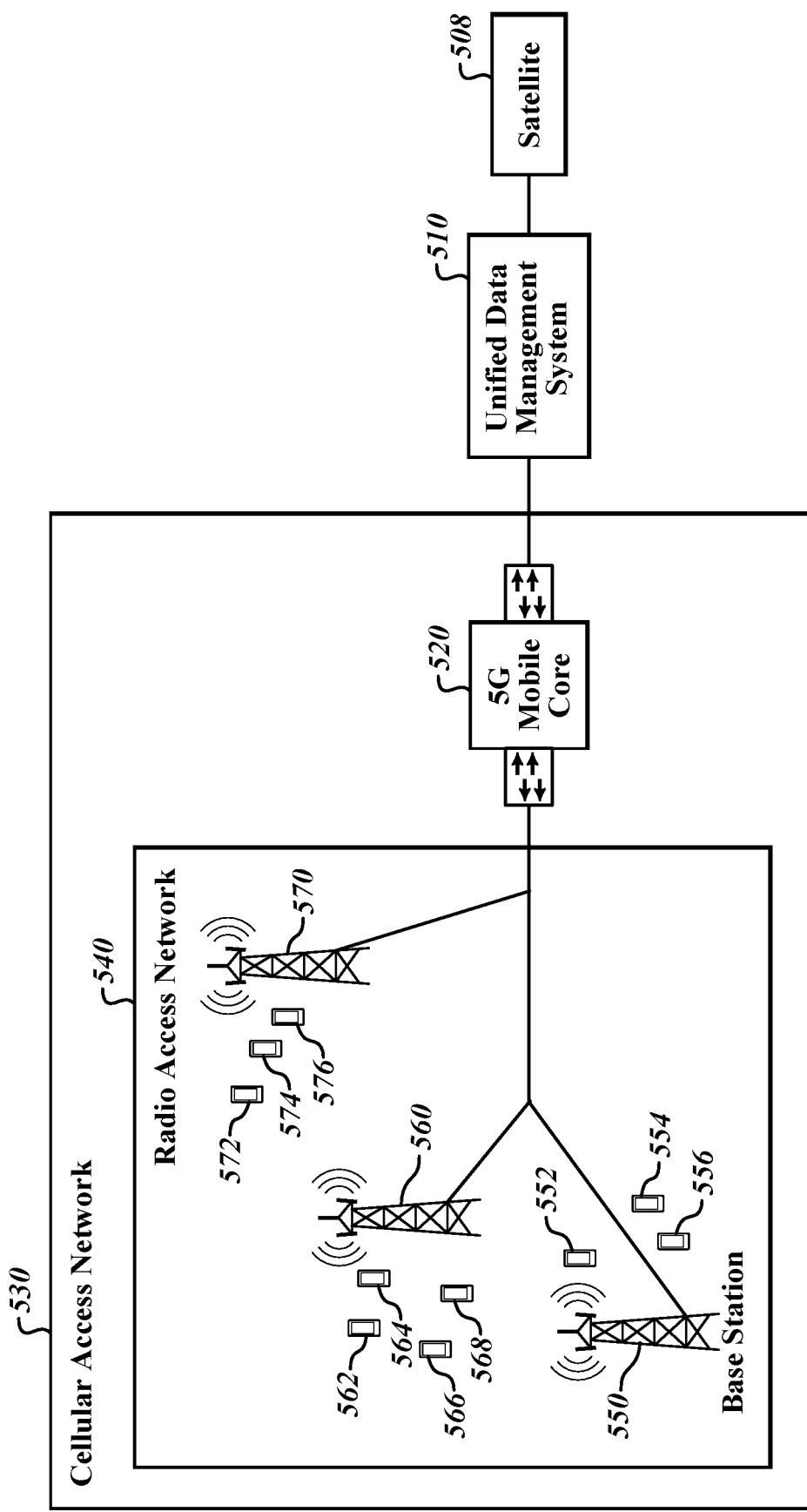
FIG. 5A illustrates a system that includes a satellite, Unified Data Management system, one or more connected 5G Cores, a plurality of base stations, and a plurality of mobile end user devices.

Referring now to FIG. 5A, some embodiments of a 5G network architecture include a satellite 508, a Unified Data Management System 510, one or more 5G Cores 520, a Cellular Access Network 530, a 5G Radio Access Network (RAN) 540, a plurality of Base Stations 550, 560, 570, and a plurality of 5G End User Mobile Devices 552, 554, 556, 562, 564, 566, 568, 572 574, and 576. As described above (and shown in FIG. 1), the 5G RAN is split into DUs (e.g., DU 108) that manage scheduling of all the users, and a CU that manages the mobility and radio resource control (RRC) state for all the UEs. The Unified Data Management System 510 may be an embodiment of the Unified Data Management System 410 shown in FIG. 4. And the 5G Core 520 may be an embodiment of one or more of the 5G Cores 420, 430, 440, 450, and 460 shown in FIG. 4. The plurality of 5G End User Mobile Devices 552, 554, 556, 562, 564, 566, 568, 572 574, and 576 may be embodiments of the plurality of mobile end user devices 422, 424, 426, 432, 434, 436, 442, 444, 446, 452, 454, 456, 462, 464, and 466 shown in FIG. 4. Referring again to FIG. 5A, the 5G RAN 540 corresponds to a distributed collection of Base Stations 550, 560, 570. As noted above, in 5G architecture the distributed collection of Base Stations 550, 560, 570 may be referred to as gNB.

The 5G Core 520 (which is sometimes referred to as a Next Generation Core) includes several functionalities that serves several purposes. Such functionalities include connectivity for data and voice services, ensuring uninterrupted service for users of the 5G end user mobile devices 552, 554, 556, 562, 564, 566, 568, 572, 574, and 576, and billing services. As shown in FIG. 5A, the 5G Core 520 is part of the architecture of the 5G cellular access network 530. The 5G Core 520 provides an access bridge between the 5G RAN 540 and the Unified Data Management System 510, which in turn is in communication with the satellite 508. In some embodiments of the enhanced PRACH 5G configuration system, each 5G Core 520 services a specific geographical area, such as a city or portion of a metropolitan area. While not shown in FIG. 5A, the associated 5G RAN 540 could service dozens or hundreds of Base Stations 550, 560, 570.

Figure 5B:
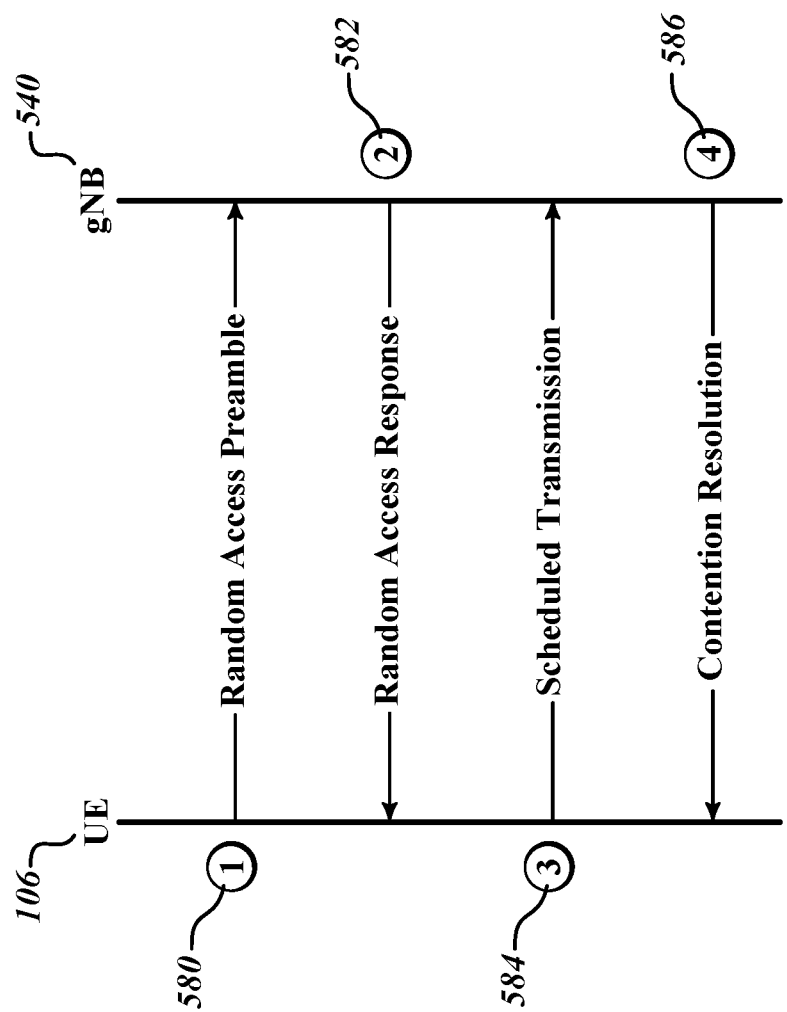
FIG. 5B illustrates an enhanced PRACH 5G configuration system displaying a Random Access Preamble from a mobile end user device to a 5G NR Next Generation Node B (gNB), and a Random Access Response from the 5G NR Next Generation Node B (gNB) to the mobile end user device.

Referring now to FIG. 5B, a preamble is a short signal that is sent before the transmission of the RACH (Random Access Channel) connection request message that is sent by a UE 106 to a gNB 540. At operation 580, a Random Access Preamble is sent from the UE 106 to the gNB 540. At operation 582, a Random Access Response is sent from the gNB 540 to the UE 106. At operation 584, a Scheduled Transmission is sent from the UE 106 to the gNB 540. At operation 586, Contention Resolution is sent from the gNB 540 to the UE 106.

A RACH is a shared channel used by wireless terminals to access the mobile network for call set-up and data transmission. The mobile user's device (referred to herein as user equipment ("UE")) UE 106 can repeatedly transmit the preamble, e.g., at operation 580, by increasing the transmission power each time the preamble is sent until the network indicates the detection of the preamble, e.g., at operation 582. However, since multiple preambles are being sent at one time, preamble collisions may occur. Additionally, the transmission power of the signal for one preamble may interfere with the signal of another preamble, even if they do not collide.

An interfered preamble may cause an error in the incoming packet judgment by the gNB and cause the gNB 540 to drop the packet directly. The interfered preamble results in symbol synchronization failure and produces severe errors on channel estimation, Both of these results degrade the decoding performance of the gNB 540 significantly.

Cell search is the procedure for a UE 106 to acquire synchronization with a gNB 540 and to detect Physical layer Cell ID (PCI) of a gNB 540. During cell search operations, the UE 106 uses NR synchronization signals and PBCH to derive the necessary information required to access the gNB 540. The UE 106 always scans the radio signals and their measurements so the UE processes the beam measurements and detects the best beam during synchronization. Thus, the UE 106 decodes 5G NR system information on that beam.

RACH is the first message from a UE 106 to a 5G NR Next Generation Node B when a user powers on to synchronize with the best listening gNB 540. In this procedure, the UE 106 randomly selects the preamble in a Zadoff Chu sequence and sends the RACH request towards the network. The Zadoff-Chu sequences are used to generate NR random-access preambles (PRACH). Zadoff-Chu sequences have the unique properties of constant amplitude before Discrete Fourier transform (DFT) and after DFT, zero cyclic auto-correlation, and low cross-correlation.

In the RACH Procedure of operation 580, UE 106 selects a preamble randomly from a pool of preambles shared with other UEs. Accordingly, the UE 106 has the potential risk of selecting the same preamble as another UE and subsequently may experience conflict or contention. The 5G NR Next Generation Node B (gNB) 540 uses a contention resolution mechanism to handle this type access request. In this procedure, the result is random and not all Random Access succeeds.

The PRACH Configuration Index (prachConfIndex) parameter specifies the index, which informs UE 106 of which frame number and which subframe number (SFN) within the frame has PRACH resources. RACH root sequence planning is dependent on PRACH cyclic shift. The cyclic shift dimensioning is a significant aspect in the RACH configuration. PRACH (Physical Random Access Channel) is used by UEs 106 to request an uplink allocation from the base station. The UE 106 calculates the preamble by applying a cyclic-shift on the Root Sequence Index.

Traditional PRACH planning and configuration is performed using the same PRACH configuration index in all gNB 540. Thus, different gNB 540 from the same site need to be configured with different root sequence index (RSI) in order to avoid preamble collisions from UEs 106 in different sectors.

This method has two important technology problems. First, the RSI reuse distance is low since typically three root sequences are required for each gNB 540, i.e., one per sector. Second, PRACH interference among different sectors may cause degradation of PRACH performance as PRACH transmissions from different sectors utilize the same frequency and time resources.

In such situations, the RACH (Random Access Channel) success rate may be unacceptably low. One reason for decreasing RACH success rates is that multiple UEs 106 are utilizing the same preamble ID, which leads to RAPID (Random Access Preamble Identifier) mismatch. This may be due to inconsistent Root Sequence Index (RSI) planning, which is used as a seed to generate the preamble.

Another reason for decreasing RACH success rates is due to interference. RACH preamble transmission power may be used in such a way that it causes interference, such as using inconsistent power parameter values. This may happen when the PRACH configuration index is the same across all sectors. Sites are typically divided into three sectors for a geographical area.

In some embodiments of the enhanced PRACH configuration system described herein, a PRACH configuration is implemented in which the same root sequence index (RSI) is utilized on the three sectors of the same site. In such embodiments, the PRACH transmissions on different sectors utilize different time slots, different frequency resources, or both in order to avoid collisions and interference.

Thus, the current system employs PRACH planning and configuration in such a way as to avoid preamble RAPID mismatch, and avoid interference. In one aspect of some embodiments, the enhanced PRACH configuration system avoids preamble collisions by employing a shift in the time domain (using different time slots). In another aspect of some embodiments, the enhanced PRACH configuration system avoids preamble collisions by employing a shift in the frequency domain. In still another aspect of some embodiments, the enhanced PRACH configuration system avoids preamble collisions by employing a shift in the time domain and a shift in the frequency domain. These techniques avoid preamble collision during uplink opportunities.

In some embodiments, the enhanced PRACH configuration system described herein includes a planning tool that randomizes opportunities and RACH locations when there is identified interference. In some situations, the RACH locations are moved to avoid identified interference. If system cannot be accessed then the system resources are useless. In this manner the enhanced PRACH configuration system reduces latency. Notably, the quicker an end user mobile device can connect to the system, the better the end user mobile device's experience is going to be.

However, in the currently disclosed embodiment, the enhanced PRACH configuration system uses the same PRACH RSI for different sectors, but implements a time shift so that the preambles arrive at different time intervals. Additionally, the distance between sectors may be increased as well, since the success rate performance is improved and interference is reduced. These are all technological improvements derived from the time shift system.

In one or more embodiments that implement PRACH transmissions on different time slots, a different PRACH configuration index is configured per sector, by way of example only, and not by way of limitation, the PRACH configuration index values of 16, 17, and 18 may be used for sectors Alpha, Beta, and Gamma respectively.

In another embodiment of the enhanced PRACH configuration system described herein, the same PRACH RSI can be used for different sectors, with frequency shift instead of a time shift. In such an embodiment, one frequency sequence is used per site. The implementation of the frequency shift by the enhanced PRACH configuration system for different sectors (while maintaining the same PRACH RSI for different sectors), results in improved performance and less interference.

In order to implement PRACH transmissions on different frequency resources, the msg1-FrequencyStart parameter is coordinated between different sectors, by way of example only, and not by way of limitation, the msg1-FrequencyStart values of 4, 10, and 16 may be used for sectors Alpha, Beta, and Gamma respectively. In addition, several root sequence indexes (RSIs) can be reserved and used for new sites if required.

Additionally, a methodology to implement the RSI planning per site and the PRACH time multiplexing with a different PRACH configuration index per sector using Planet has also been developed. Moreover, the configuration can be dynamically adapted based on PRACH performance Key Performance Indicators (KPIs) collected by the network.

In another embodiment of the enhanced PRACH configuration system described herein, different preambles include a time shift (e.g., change time slot) and a frequency shift (e.g., change frequency sequence), while allocating the same PRACH RSI across different sectors. In such embodiments of the enhanced PRACH configuration system with separate preambles including preamble time shifts and frequency shifts (but the same RSI across different sectors), different services may be separated, such as by way of example only, and not by way of limitation: (1) mobile, (2) Ultra-reliable low-latency communication (URLLC), (3) Massive Multiple In/Multiple Out (MIMO) Internet of Things (IOT).

In another aspect of the enhanced PRACH configuration system described herein, KP analysis may be examined. If the interference is identified as too high in certain Physical Resource Block (PRB) Regions where PRACH is implemented, the enhanced PRACH configuration system can move the PRB location away from the interference. In this manner, the enhanced PRACH configuration system can reduce interference in other systems as well, such as satellites, i.e., PRB Blanking so no satellite interference.

Unfortunately, traditional PRACH planning and configuration tools (e.g., Planet) assume that the PRACH configuration index is the same for different sections. Accordingly, current PRACH planning and configuration tools assume that different PRACH RSIs are allocated for different sectors.

Thus, in some embodiments, the enhanced PRACH configuration system described herein tricks the planning tool that generates planning sequences so that the same PRACH RSIs are allocated for different sectors, and a time shift and/or frequency shift is instead employed to prevent preamble collisions and interference. In one or more embodiments, the enhanced PRACH configuration system tricks the planning tool (e.g., Planet) into looking at only one sector, and then replicating that section with different values for some parameters.

FIGS. 6-17 will now be described. The various embodiments shown in these figures are interfaces of a PRACH planning tool for managing the enhanced PRACH 5G configuration system described herein.

Referring now to FIG. 6, in some embodiments, the enhanced PRACH Planning method includes updating the Frame Configuration in the Planning Tool for all the gNBs to a Long Preamble. As shown in FIG. 6, the "Cyclic Shift Configuration" column 610 is set to 12 and while the "Zadoff Chu Sequences Needed" column 620 is set to 10. Additionally, the "Reserved Zadoff Chu Sequences" column 630 is set to "752-837" for all sectors.

Figure 7:
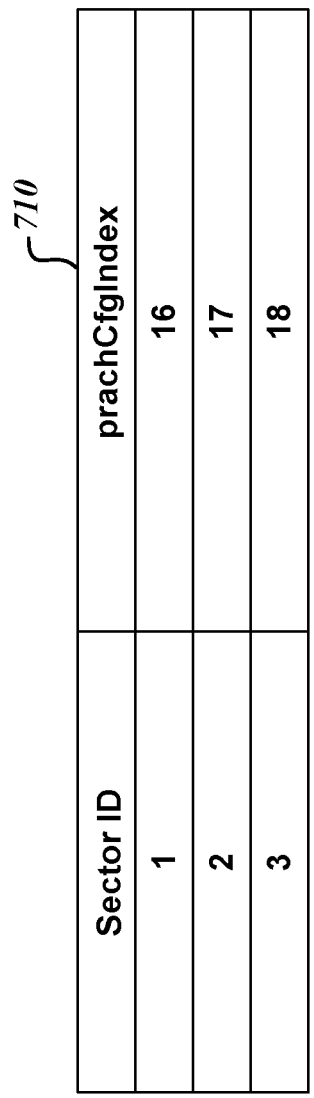
FIG. 7 illustrates the PRACH.CFG. Index per sector in a PRACH planning tool for an enhanced PRACH 5G configuration system.

Referring now to FIG. 7, in one or more embodiments, there is going to be only one PRACH planning generated using the n71 band and this plan is assigned to all the gNBs on the same sector. While each site will use the same RSI value, the "prachCfgIndex" value 710 for each sector is different. As shown in FIG. 7, a "prachCfgIndex" value 710 of 16 is configured for sector 1, a "prachCfgIndex" value 710 of 17 is configured for sector 2, and a "prachCfgIndex" value 710 of 18 is configured for sector 3. This value will be added on the CIQ configuration.

Figure 8:
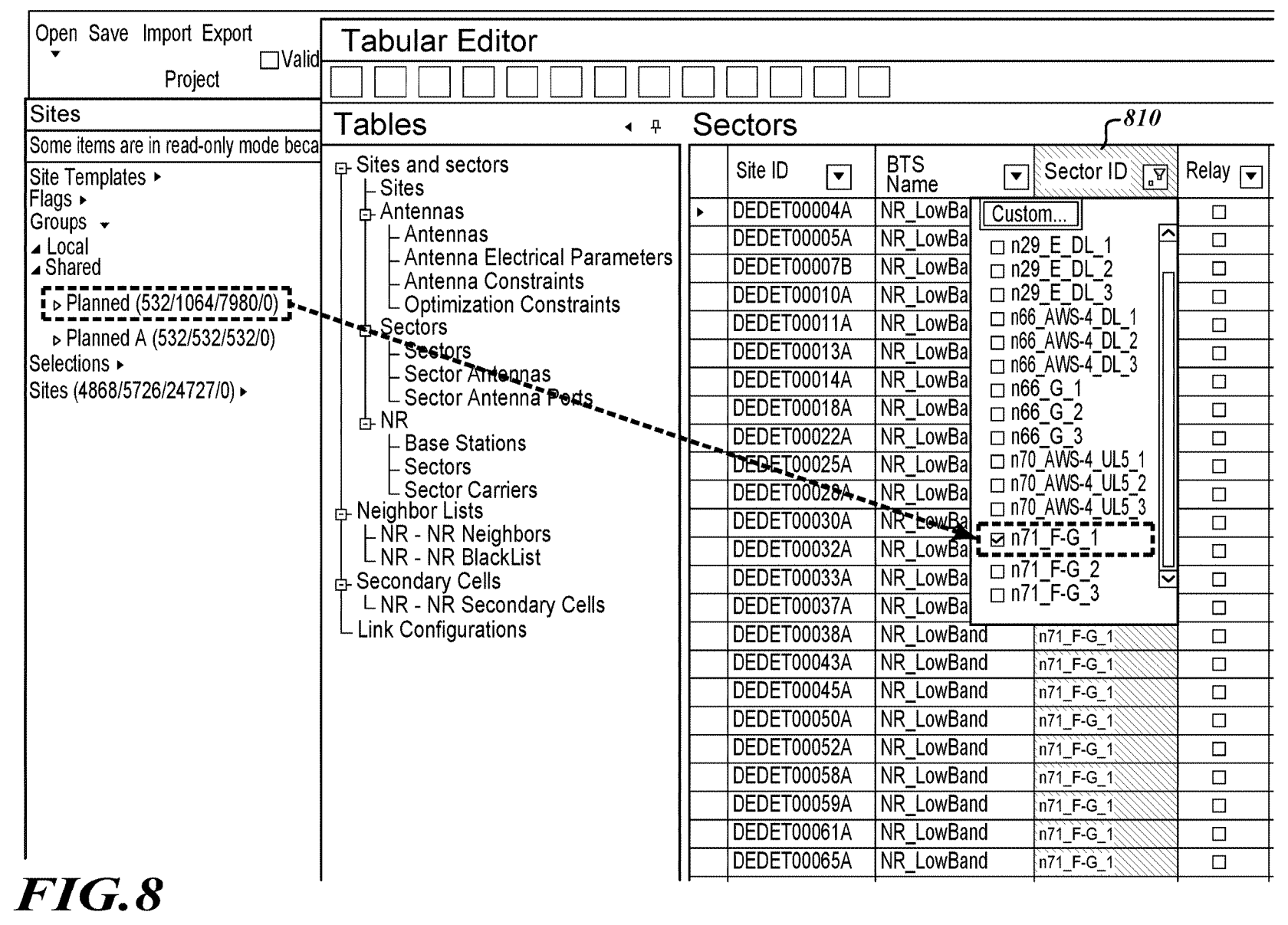

As shown in FIG. 8, in some embodiments, a new group is created with only the sector ID=1 for the n71 bands. Thus, the Sector ID column 810 is set to n71_F-G_1 for every Site ID.

Figure 9:
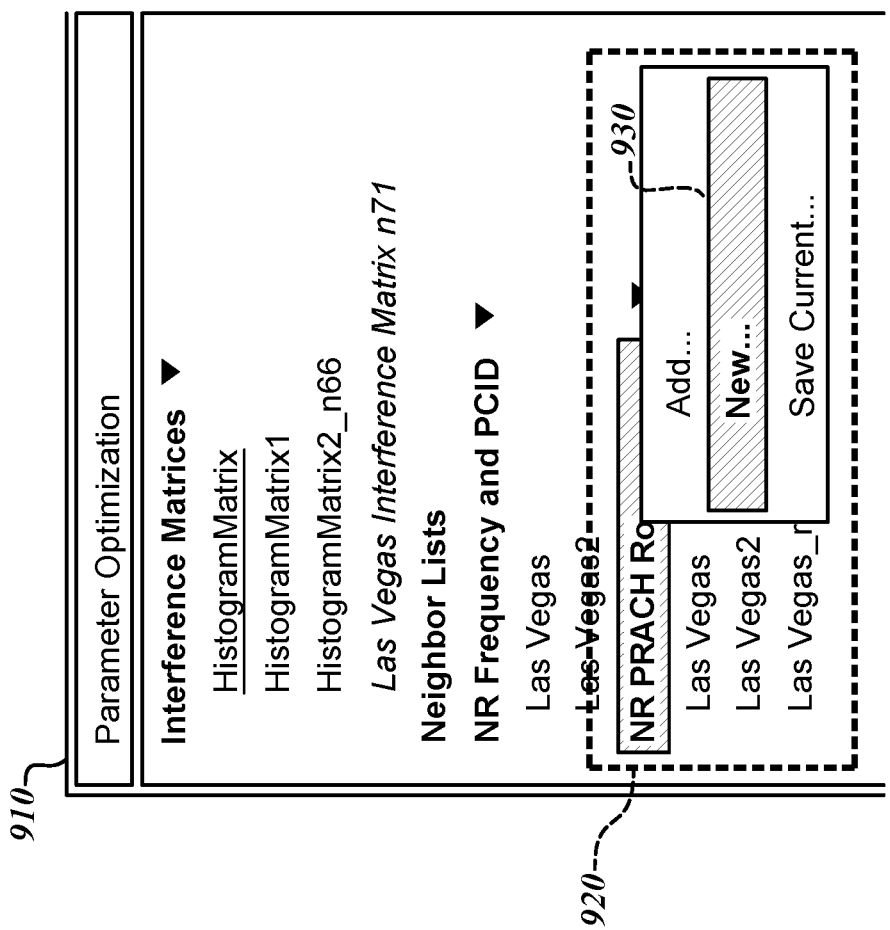
FIG. 9 illustrates creating a new PRACH planning in a PRACH planning tool for an enhanced PRACH 5G configuration system.

Referring now to FIG. 9, in one or more embodiments, a new PCI ID Planning profile is created by selecting "Parameter Optimization" 910, and then selecting "NR PRACH Root Sequence" 920. Next, the "New" virtual button 930 is selected to create the new PCI ID Planning profile.

Figure 10:
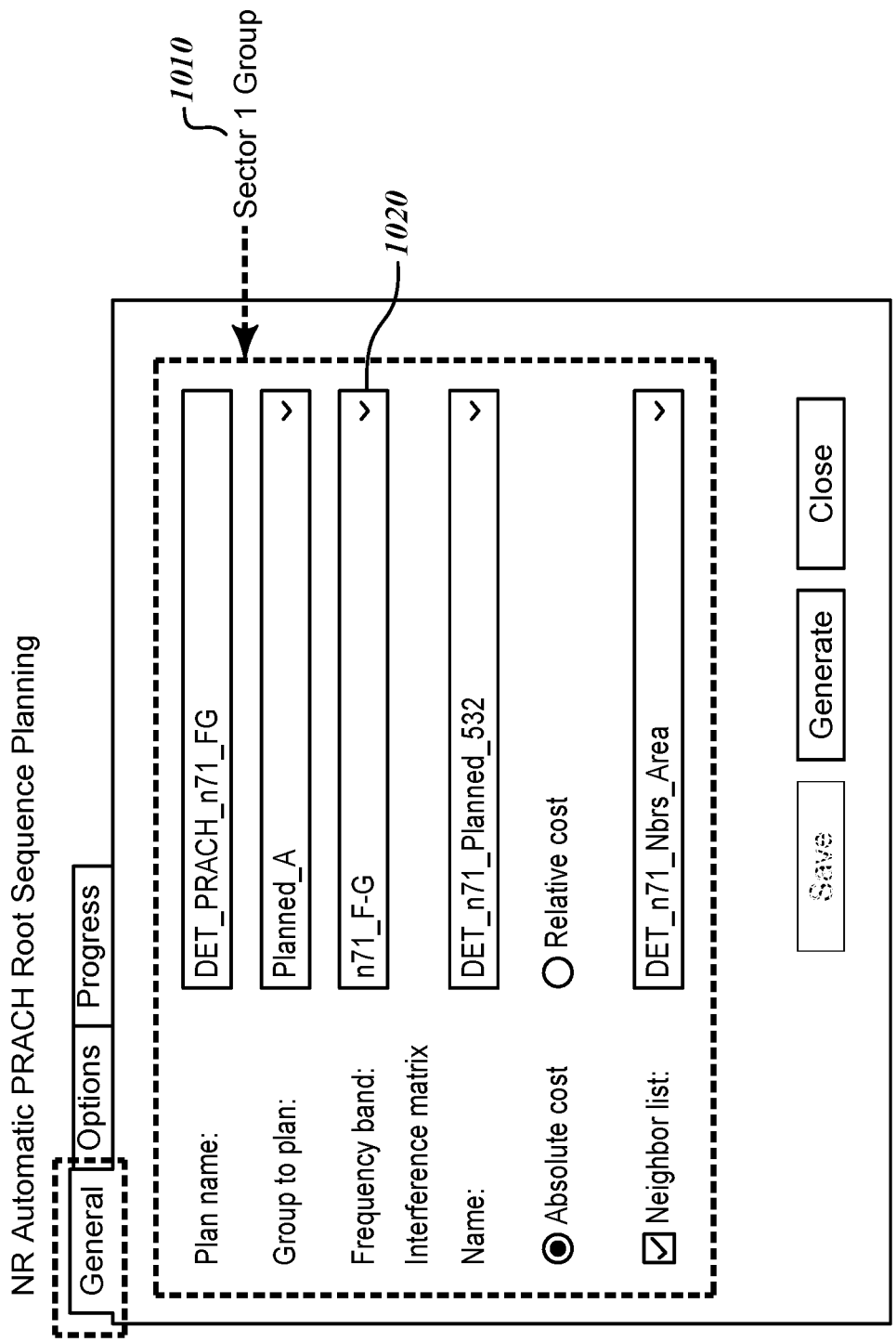
FIG. 10 illustrates the general tab in PRACH of a PRACH planning tool for an enhanced PRACH 5G configuration system.

As shown in FIG. 10, in the General Information section, several actions are taken. In one or more embodiments, the plan is named including the band of the analysis. Next, the Group of sites is selected with only sector 1 group 1010 applied to the analysis. Continuing, the n71 Band is selected in the Frequency Band 1020. Next, the Interference Matrix is selected that was previously generated for band n71. Additionally, the Neighbor list is selected for the corresponding n71 Band.

Figure 11:
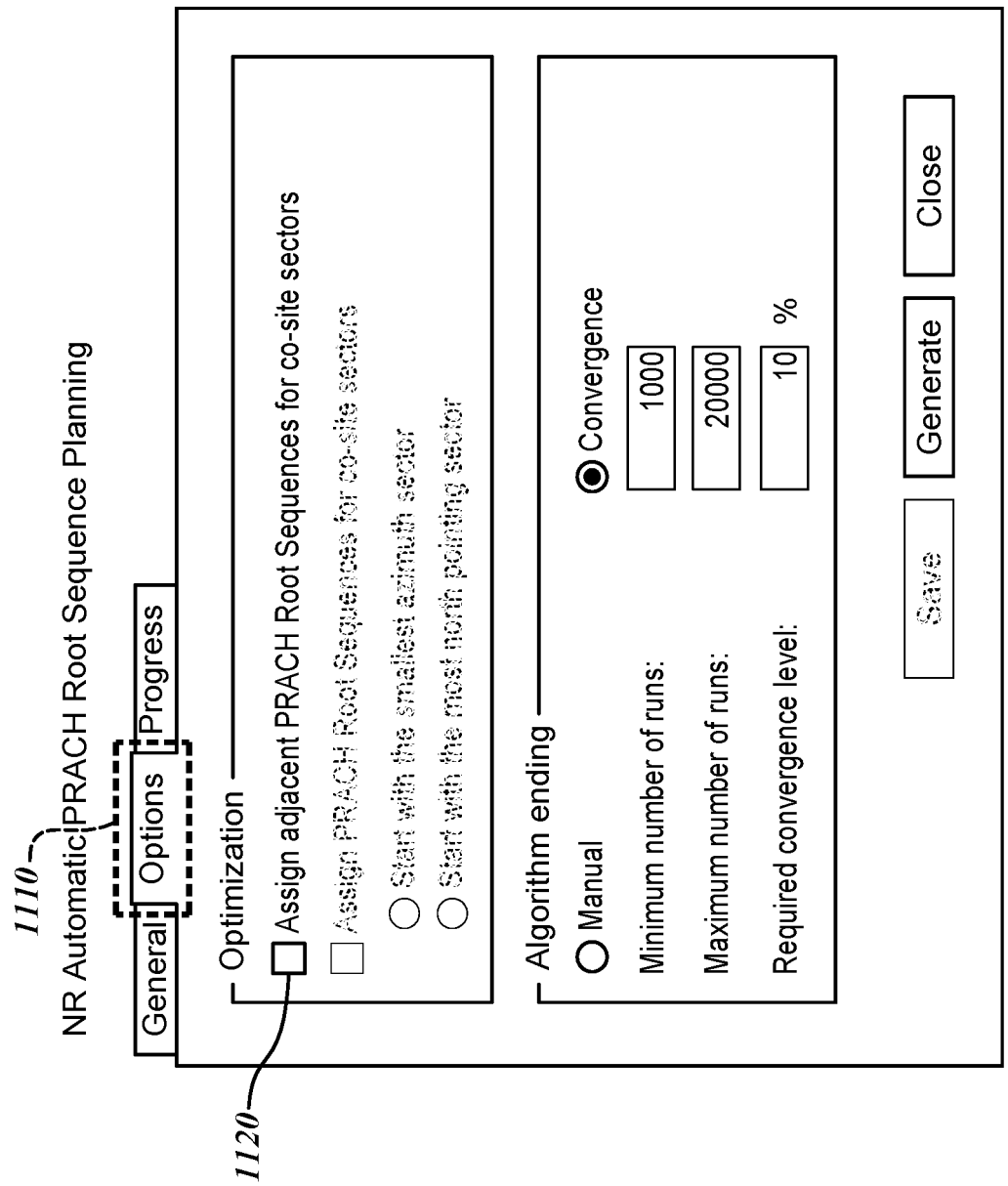
FIG. 11 illustrates the options tab in PRACH of a PRACH planning tool for an enhanced PRACH 5G configuration system.

Referring now to FIG. 11, in the enhanced PRACH Planning method the Options tab 1110 is selected, and the virtual button for "Assign adjacent PRACH Root Sequence for co-sites" 1120 is unselected. Notably, this constraint cannot be used with different Zadoff Chu numbers.

Figure 12:
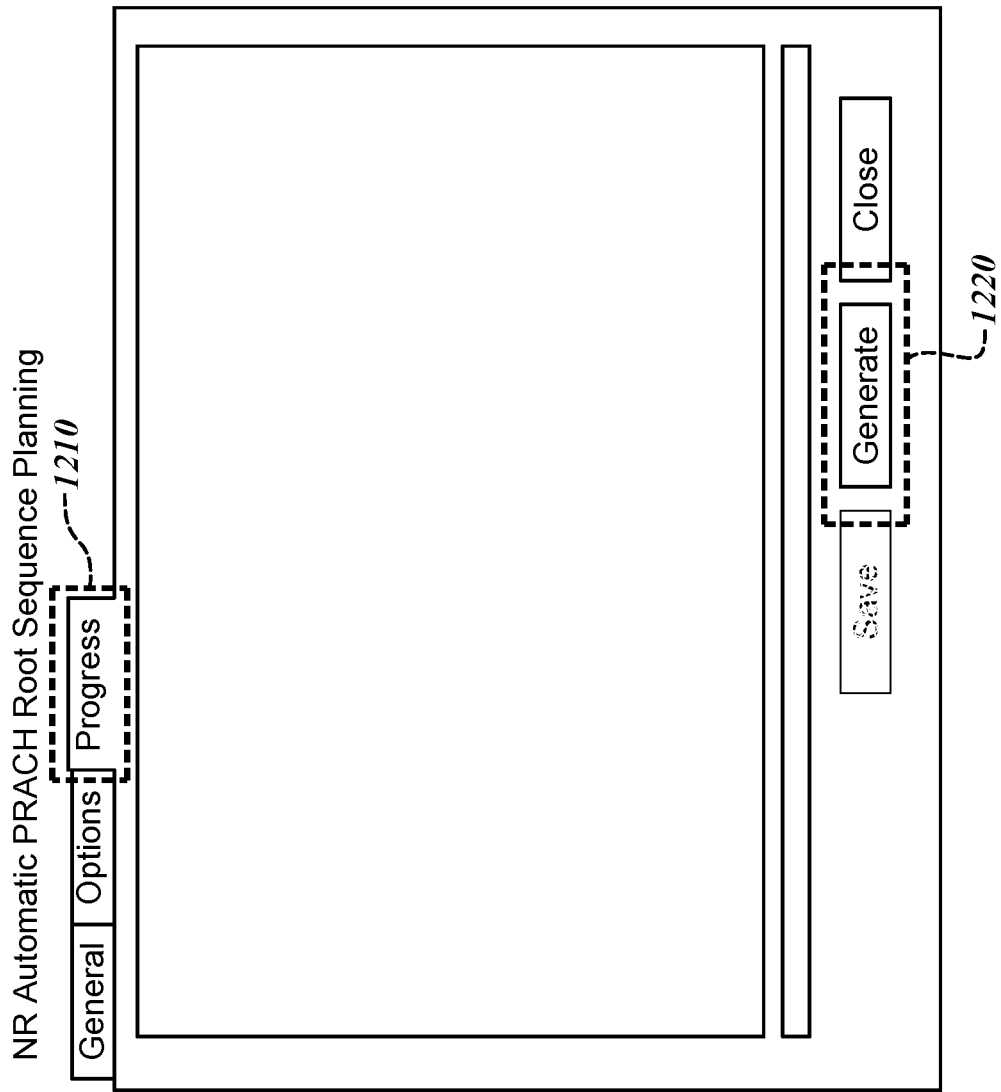
FIG. 12 illustrates the progress tab in PRACH of a PRACH planning tool for an enhanced PRACH 5G configuration system.

As shown in FIG. 12, in the enhanced PRACH Planning method the Progress tab 1210 is selected, and the "Generate" virtual button 1220 is selected and the PRACH Plan is generated.

Figure 13:
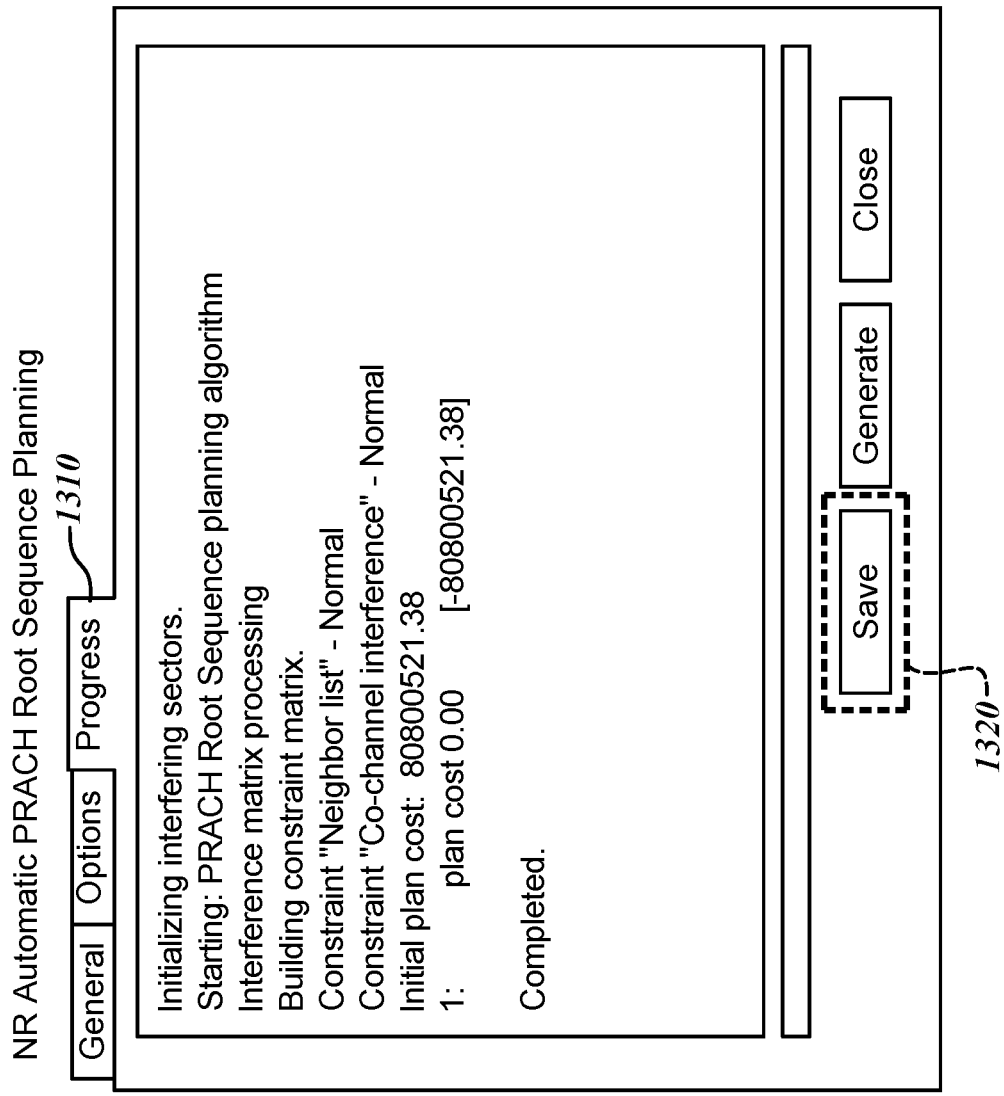
FIG. 13 illustrates the save PRACH Planning function of a PRACH planning tool for an enhanced PRACH 5G configuration system.

In the portion of the enhanced PRACH Planning method shown in FIG. 13, while still in the Progress tab 1310, the "Save" virtual button 1320 is selected and the PRACH Plan is saved.

Figure 14:
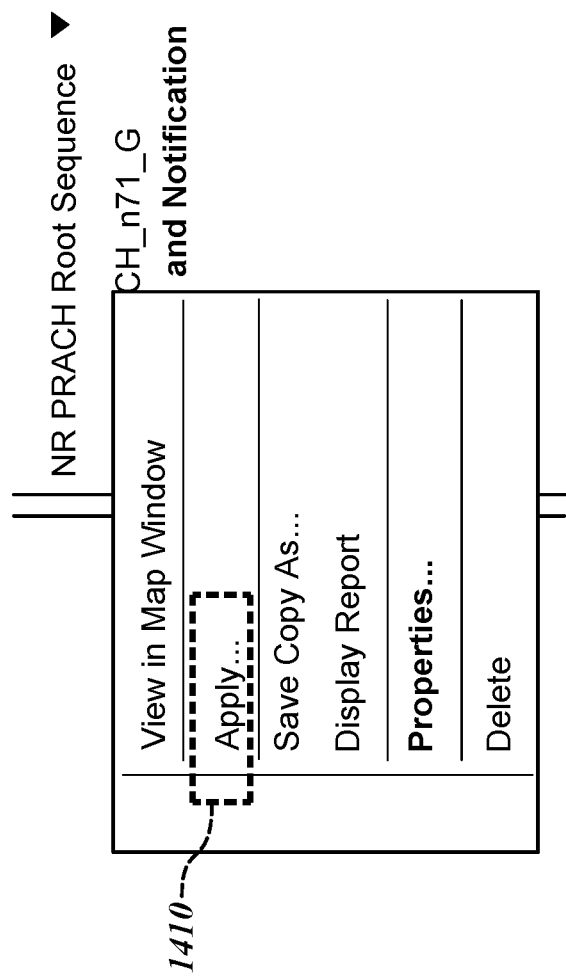
FIG. 14 illustrates the apply PRACH Planning function of a PRACH planning tool for an enhanced PRACH 5G configuration system.

Referring now to FIG. 14, after the PRACH Plan has been completed, the PRACH Plan may be applied. Specifically, when the plan is completed, go to the "Parameter Optimization" section, select "NR Frequency and PCID", then select the plan, and then select the "Apply" virtual button 1410.

Next, with reference to FIG. 15, after applying the plan, check on the "First Zadoff Chu Sequences" column 1510, and confirm that in the "sector 1 group", the final assigned sequence is 740.

Referring now to FIGS. 16A and 16B, in one or more embodiments of the enhanced PRACH Planning method, the generated sequence of sector 1 for each site is used for all the gNBs in every sector (e.g., low band and mid band) in the same site. Specifically, in FIG. 16A the "Site ID" column 1610 of every Sector ID is DEDET00004A and the "First Zadoff Chu Sequences" column 1620 is 0, except for Sector ID n71_F-G_1 which is 500. In FIG. 16B, the "First Zadoff Chu Sequences" column 1620 is now 500 for every Sector ID.

Next, with reference to FIG. 17, in case of multiple n71 bands in the Age of Information (AOI), the first PRACH plan is applied before creating and generating the second n71 block. AOI is a metric to quantify the freshness of information in the perspective of destination. In this manner, the steps are repeated for the other n71 block. In some embodiments of the enhanced PRACH Planning method, PRACH values are located in Tabular Editor under NR→Sectors→First Zadoff Sequence.

In another aspect of some embodiments, on the CIQ file, a "prachCfgIndex" column 1710 is added. In one or more embodiments, the sectors and prachCfgIndex values are as follows: Sector 1 has a prachCfgIndex value of 16, Sector 2 has a prachCfgIndex value of 17, and Sector 3 has a prachCfgIndex value of 18. In another aspect of some embodiments of the enhanced PRACH Planning method, three RSI sequences are held on reserve that may be used to replace any planned sequence if needed as follows: Sequence 0 to 9; Sequence 750-759; and Sequence 760-769.

Figure 18A:
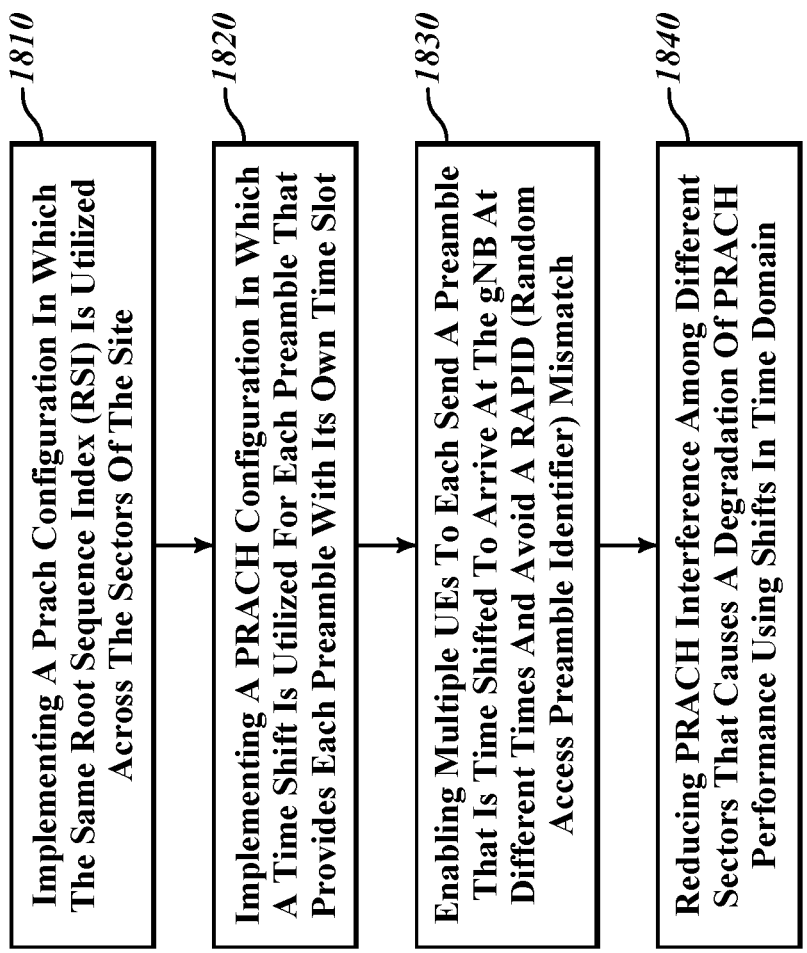
FIG. 18A is a logic diagram showing number sequencing data flow between certain telecommunication network components during enhanced PRACH 5G configuration.

FIG. 18A is a logic diagram showing enhanced PRACH 5G configuration by preventing interference with signal transmission. As shown in FIG. 18A, at operation 1830, a PRACH configuration is implemented in which the same Root Sequence Index (RSI) is utilized across the sectors of the site. At operation 1840, a PRACH Configuration is implemented in which a time shift is utilized for each preamble that provides each preamble with its own time slot. At operation 1850, Multiple UEs are enabled to each send a preamble that is time shifted to arrive at the gNB at different times and avoid a Random Access Preamble Identifier (RAPID) mismatch. At operation 1860, PRACH interference among different sectors that causes a degradation of PRACH performance is reduced using shifts in time domain.

Figure 18B:
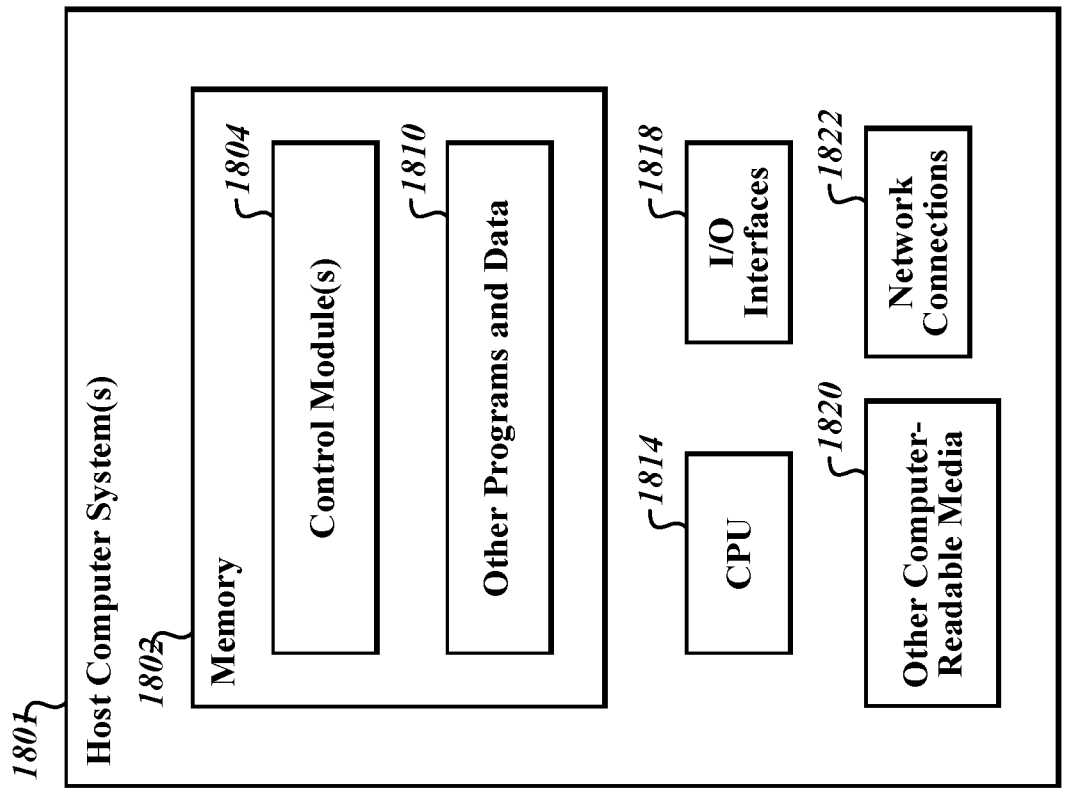
FIG. 18B shows a system diagram that describes an example implementation of a computing system(s) for implementing embodiments described herein.

FIG. 18B shows a system diagram that describes an example implementation of a computing system(s) for implementing embodiments described herein. The functionality described herein for Enhanced PRACH 5G configuration by preventing interference with signal transmission, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility.

In particular, shown is example host computer system(s) 1801. For example, such computer system(s) 1801 may represent those in various data centers and gNBs shown and/or described herein that host the functions, components, microservices and other aspects described herein to implement an enhanced PRACH 5G configuration by preventing interference with signal transmission. In some embodiments, one or more special-purpose computing systems may be used to implement the functionality described herein. Accordingly, various embodiments described herein may be implemented in software, hardware, firmware, or in some combination thereof. Host computer system(s) 1801 may include memory 1802, one or more central processing units (CPUs) 1814, I/O interfaces 1818, other computer-readable media 1820, and network connections 1822.

Memory 1802 may include one or more various types of non-volatile and/or volatile storage technologies. Examples of memory 1802 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 1802 may be utilized to store information, including computer-readable instructions that are utilized by CPU 1814 to perform actions, including those of embodiments described herein.

Memory 1802 may have stored thereon control module(s) 1804. The control module(s) 1804 may be configured to implement and/or perform some or all of the functions of the systems, components and modules described herein for Enhanced PRACH 5G configuration by preventing interference with signal transmission. Memory 1802 may also store other programs and data 1810, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, etc.

Network connections 1822 are configured to communicate with other computing devices to facilitate the functionality described herein. In various embodiments, the network connections 1822 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1818 may include a video interface, other data input or output interfaces, or the like. Other computer-readable media 1820 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for enhanced Physical Random Access Channel (PRACH) Fifth-Generation (5G) configuration, the method comprising:
providing, by a mobile network operator, a distributed unit (DU) of a fifth-generation New Radio (5G NR) cellular telecommunication network radio access network (RAN) that is served by a particular 5G NR cellular site base station, wherein the DU:
is associated with a 5G NR Next Generation Node B (gNB) identified by a primary identifier (ID), wherein a primary gNB are a distributed collection of base stations; and
is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID;

implementing a PRACH configuration in which a same root sequence index (RSI) is utilized across sectors of a site for calculating a plurality of preambles;

implementing the PRACH configuration in which a time shift is utilized for a preamble of the plurality of preambles that provides each preamble of the plurality of preambles with its own time slot;

enabling multiple User Equipment (UEs) to each send a preamble of the plurality of preambles that is time shifted to arrive at the primary gNB at different times and avoid a Random Access Preamble Identifier (RAPID) mismatch; and receiving preambles of the plurality of preambles that are time shifted and reducing PRACH interference among different sectors that causes a degradation of PRACH performance using shifts in time domain.

2. The method of claim 1, further comprising:
reducing latency by improving preamble success rate.

3. The method of claim 1, further comprising:
assigning PRACH configuration index values of 16, 17, and 18 for sectors Alpha, Beta, and Gamma, respectively.

4. The method of claim 1, further comprising:
moving a Physical Resource Block (PRB) location away from interference, in response to interference being identified as too high in certain PRB regions where PRACH is implemented.

5. The method of claim 1, further comprising:
assigning three sectors per site.

6. The method of claim 1, further comprising:
assigning a different PRACH configuration index per sector.

7. The method of claim 1, further comprising: tricking a PRACH planning tool for a planning sequence so that the same PRACH RSIs are allocated for different sectors, wherein the PRACH planning tool is configured to only view at a single sector, and then replicate the RSI to different sectors with different time shift values.

8. A system for enhanced Physical Random Access Channel (PRACH) Fifth-Generation (5G) configuration, the system comprising:
a memory that stores computer-executable instructions; and
a processor that executes the computer-executable instructions and causes the processor to:
provide, by a mobile network operator, a distributed unit (DU) of a fifth-generation New Radio (5G NR) cellular telecommunication network radio access network (RAN) that is served by a particular 5G NR cellular site base station, wherein the DU:
is associated with a 5G NR Next Generation Node B (gNB) identified by a primary identifier (ID); and
is in operable communication with a corresponding primary central unit control plane (CU-CP) of a 5G NR primary centralized unit (CU) that is hosted on a cloud-native virtualized compute instance in a primary cloud availability zone and is also associated with a primary gNB identified by the primary ID;
implement a PRACH configuration in which a same root sequence index (RSI) is utilized across sectors of a site;
implement a PRACH configuration in which a frequency shift is utilized for a preamble of the plurality of preambles that provides each preamble of the plurality of preambles with its own frequency;
enable multiple User Equipment (UEs) to each send a preamble of the plurality of preambles that is frequency shifted to arrive at the gNB at different frequency and avoid a Random Access Preamble Identifier (RAPID) mismatch; and
receive preambles of the plurality of preambles that are frequency shifted and reduce PRACH interference among different sectors that causes a degradation of PRACH performance using shifts in frequency domain.

9. The system of claim 8, wherein the system for enhanced PRACH 5G configuration reduces latency by improving preamble success rate.

10. The system of claim 8, wherein message Frequency Start values of 4, 10, and 16 are used for sectors Alpha, Beta, and Gamma, respectively.

11. The system of claim 8, wherein there are three sectors per site.

12. The system of claim 8, wherein a different PRACH configuration index is used per sector.

13. The system of claim 8, wherein a PRACH planning tool for planning sequences is tricked so that the same PRACH RSIs are allocated for different sectors, wherein the PRACH planning tool is configured to only view at a single sector, and then replicate the RSI to different sectors with different frequency shift values.

14. A non-transitory computer-readable storage medium for enhanced Physical Random Access Channel (PRACH) configuration, the non-transitory computer-readable storage medium having computer-executable instructions stored thereon that, when executed by a processor, cause the processor to:
provide, by a mobile network operator, a distributed unit (DU) of a fifth-generation New Radio (5G NR) cellular telecommunication network radio access network (RAN) that is served by a particular 5G NR cellular site base station, wherein the DU:
is associated with a 5G NR Next Generation Node B (gNB) identified by a primary identifier (ID); and
is in operable communication with a corresponding primary central unit control plane (CU-CP) of a 5G NR primary centralized unit (CU) that is hosted on a cloud-native virtualized compute instance in a primary cloud availability zone and is also associated with a primary gNB identified by the primary ID;
implement a PRACH configuration in which a same root sequence index (RSI) is utilized across sectors of a site;
implement a PRACH configuration in which one or more of a time shift or frequency shift is utilized for a preamble of the plurality of preambles that provides each preamble of the plurality of preambles with its own time slot, frequency, or both;
enable multiple User Equipment (UEs) to each send a preamble of the plurality of preambles that is time shifted, frequency shifted, or both to arrive at the gNB at one or more of different times or frequencies and avoid a Random Access Preamble Identifier (RAPID) mismatch; and
receive preambles of the plurality of preambles that are time shifted, frequency shifted, or both and reduce PRACH interference among different sectors that causes a degradation of PRACH performance using shifts in one or more of time domain or frequency domain.

15. The non-transitory computer-readable storage medium of claim 14, wherein PRACH configuration index values of 16, 17, and 18 are used for sectors Alpha, Beta, and Gamma, respectively.

16. The non-transitory computer-readable storage medium of claim 15, wherein a PRACH planning tool for planning sequences is tricked so that same PRACH RSIs are allocated for different sectors, wherein the PRACH planning tool is configured to only view at a single sector, and then replicate the RSI to different sectors with different frequency shift values.

17. The non-transitory computer-readable storage medium of claim 14, wherein message Frequency Start values of 4, 10, and 16 are used for sectors Alpha, Beta, and Gamma, respectively.

18. The non-transitory computer-readable storage medium of claim 14, wherein there are three sectors per site.

19. The non-transitory computer-readable storage medium of claim 14, wherein a different PRACH configuration index is used per sector.

20. The non-transitory computer-readable storage medium of claim 14, wherein a PRACH planning tool for planning sequences is tricked so that same PRACH RSIs are allocated for different sectors, wherein the PRACH planning tool is configured to only view at a single sector, and then replicate the RSI to different sectors with different time shift values.

\* \* \* \* \*